United States Patent [19]
Baldamus et al.

[11] Patent Number: 4,648,208
[45] Date of Patent: Mar. 10, 1987

[54] DOOR UNIT FOR MOTOR VEHICLES

[75] Inventors: Haimo Baldamus, Untersiemau; Ferenc Szerdahelyi, Coburg; Peter Hess, Coburg; Manfred Bauer, Ebersdorf, all of Fed. Rep. of Germany

[73] Assignee: Brose Fahreugteile GmbH & Co. Kommanditgesellschaft, Fed. Rep. of Germany

[21] Appl. No.: 473,592

[22] Filed: Mar. 9, 1983

[30] Foreign Application Priority Data

Mar. 12, 1982 [DE] Fed. Rep. of Germany ....... 3209052
May 11, 1982 [DE] Fed. Rep. of Germany ....... 3217640

[51] Int. Cl.4 .............................................. B60J 5/04
[52] U.S. Cl. ..................................................... 49/502
[58] Field of Search .................................. 49/202, 503

[56] References Cited

U.S. PATENT DOCUMENTS 2,650,857  9/1953  Watter et al. .
2,658,790  11/1953  Fish et al. .
2,707,320  5/1955  Fish .
2,791,464  5/1957  Renno .
2,807,498  9/1957  Nelson .
3,069,197  12/1962  Wernig .
3,370,384  2/1968  Hafer et al. .
3,782,036  1/1974  Clark et al. .

FOREIGN PATENT DOCUMENTS 1455812  3/1964  Fed. Rep. of Germany .
1755057  3/1968  Fed. Rep. of Germany .
1923943  5/1969  Fed. Rep. of Germany .
2023067  5/1970  Fed. Rep. of Germany .
2240858  8/1972  Fed. Rep. of Germany .
2426705  6/1974  Fed. Rep. of Germany .
2934278  8/1979  Fed. Rep. of Germany .
3104681  2/1981  Fed. Rep. of Germany .
3119595  5/1981  Fed. Rep. of Germany .
0015201  2/1980  France .
WO81/03467  12/1981  World Int. Prop. O. .
1372752  11/1974  United Kingdom .

Primary Examiner—Kenneth Downey
Attorney, Agent, or Firm—Barnes & Thornburg

[57] ABSTRACT

An automobile door is proposed with a unit carrier on which built-in units, especially a complete window winder with window pane can be preassembled. Only afterwards on preassembly the unit carrier is brought together with the door's outer shell to form the door. Both door hinges as well as a door lock are secured on the unit carrier.

29 Claims, 32 Drawing Figures

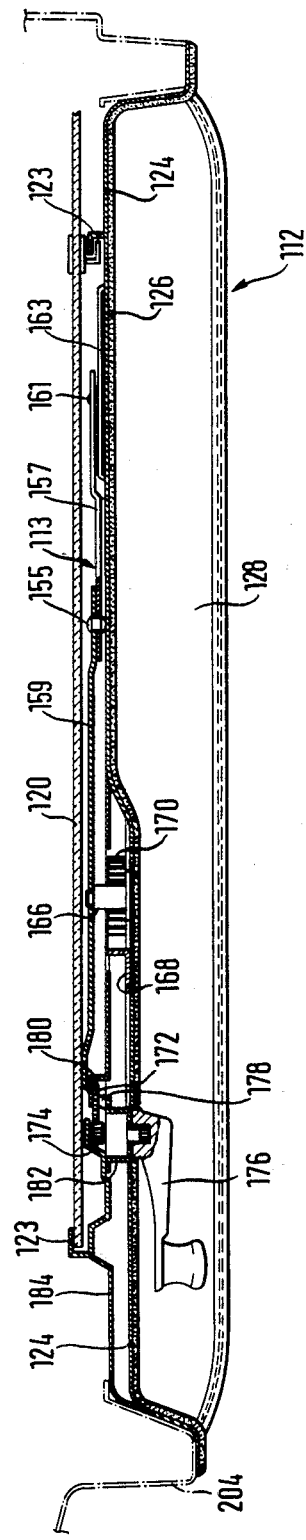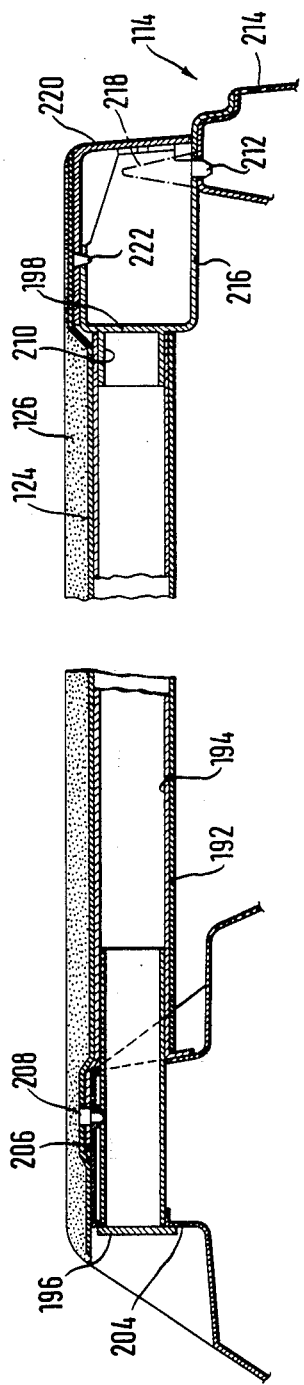

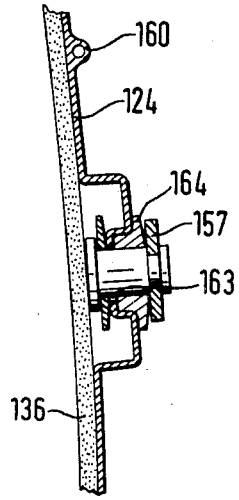
FIG. 10
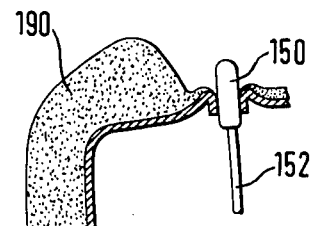
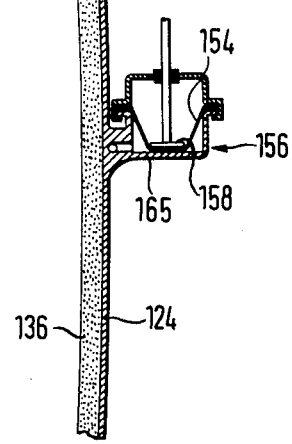
FIG. 11
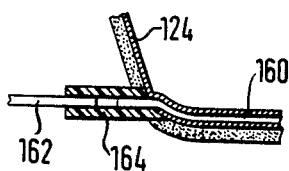
FIG. 12

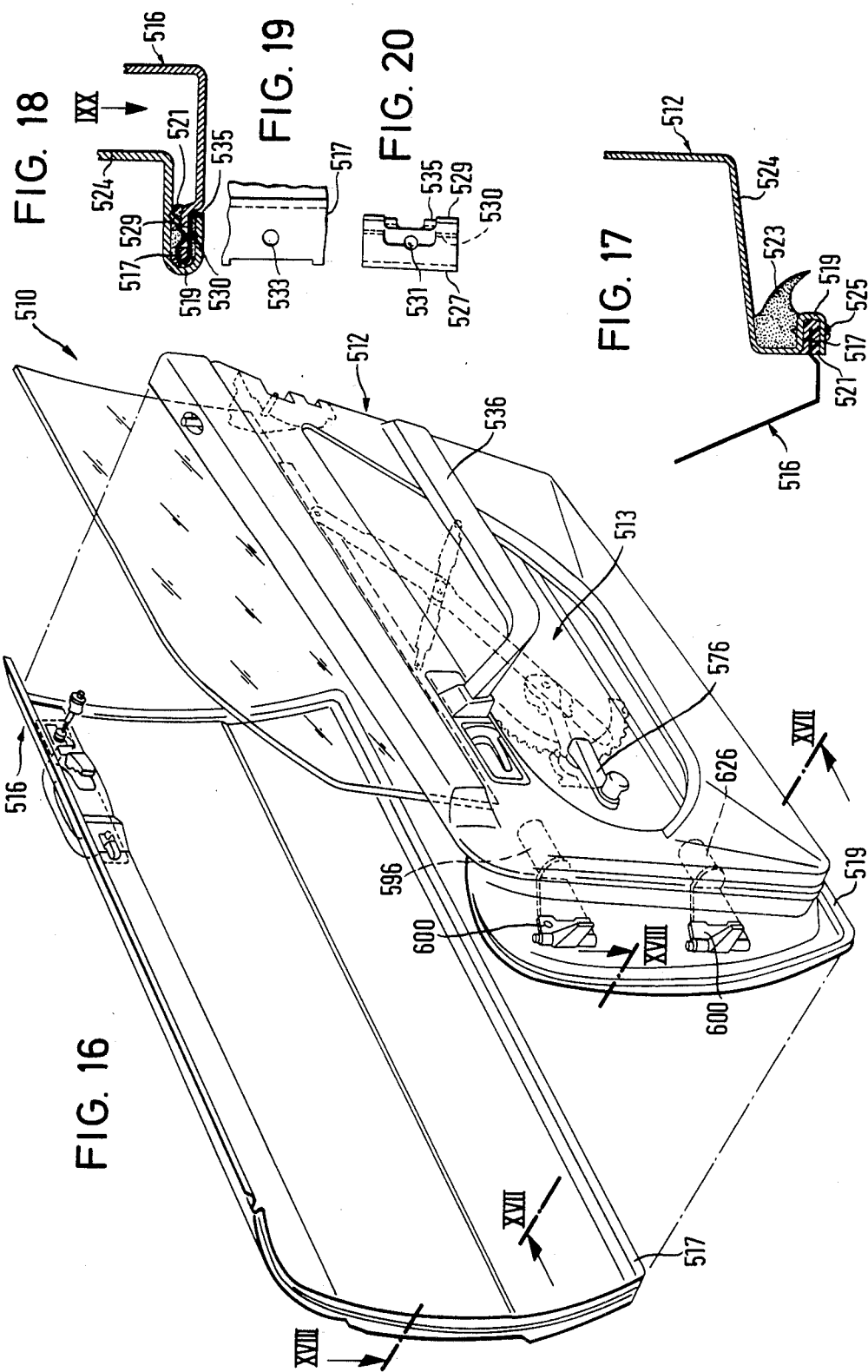

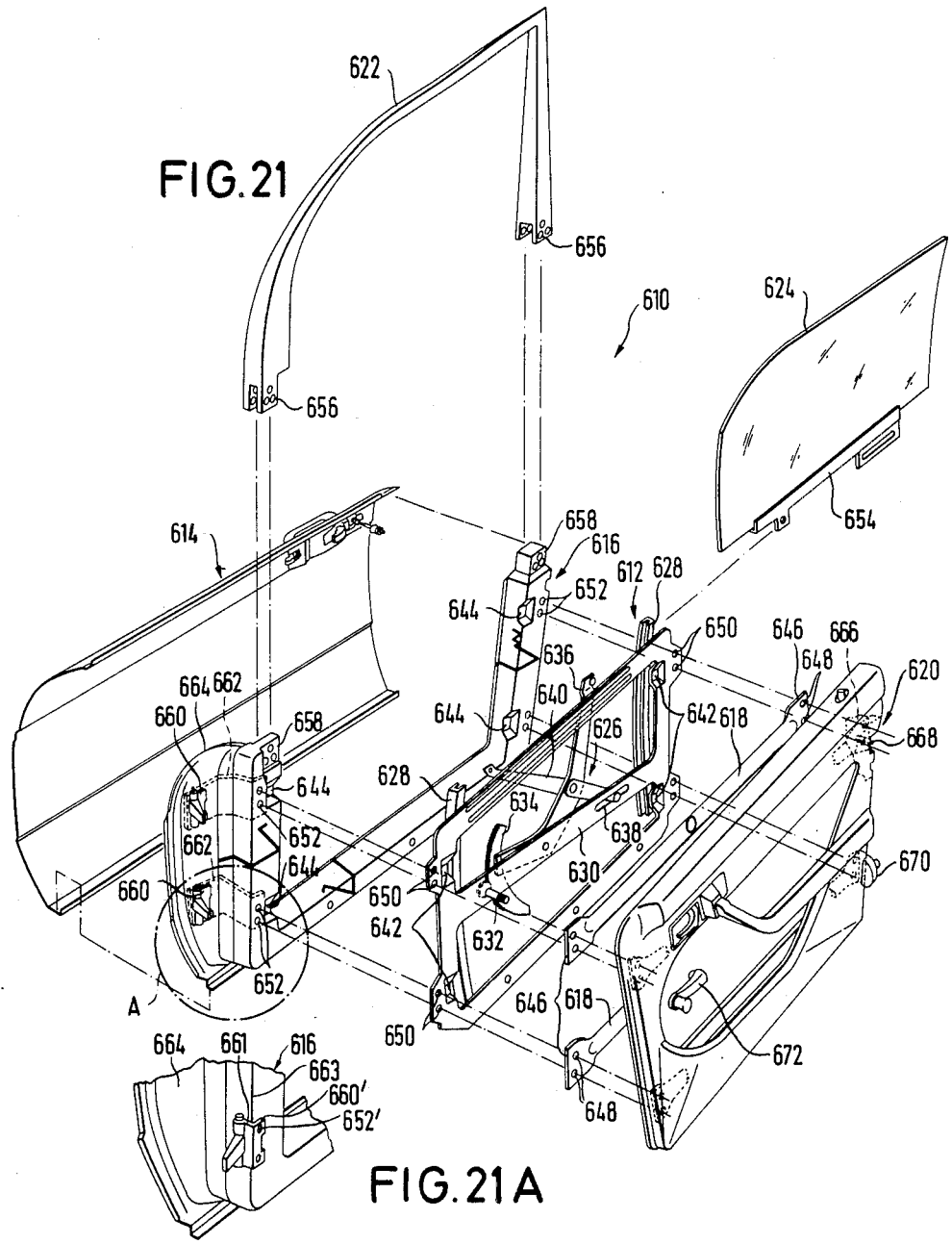

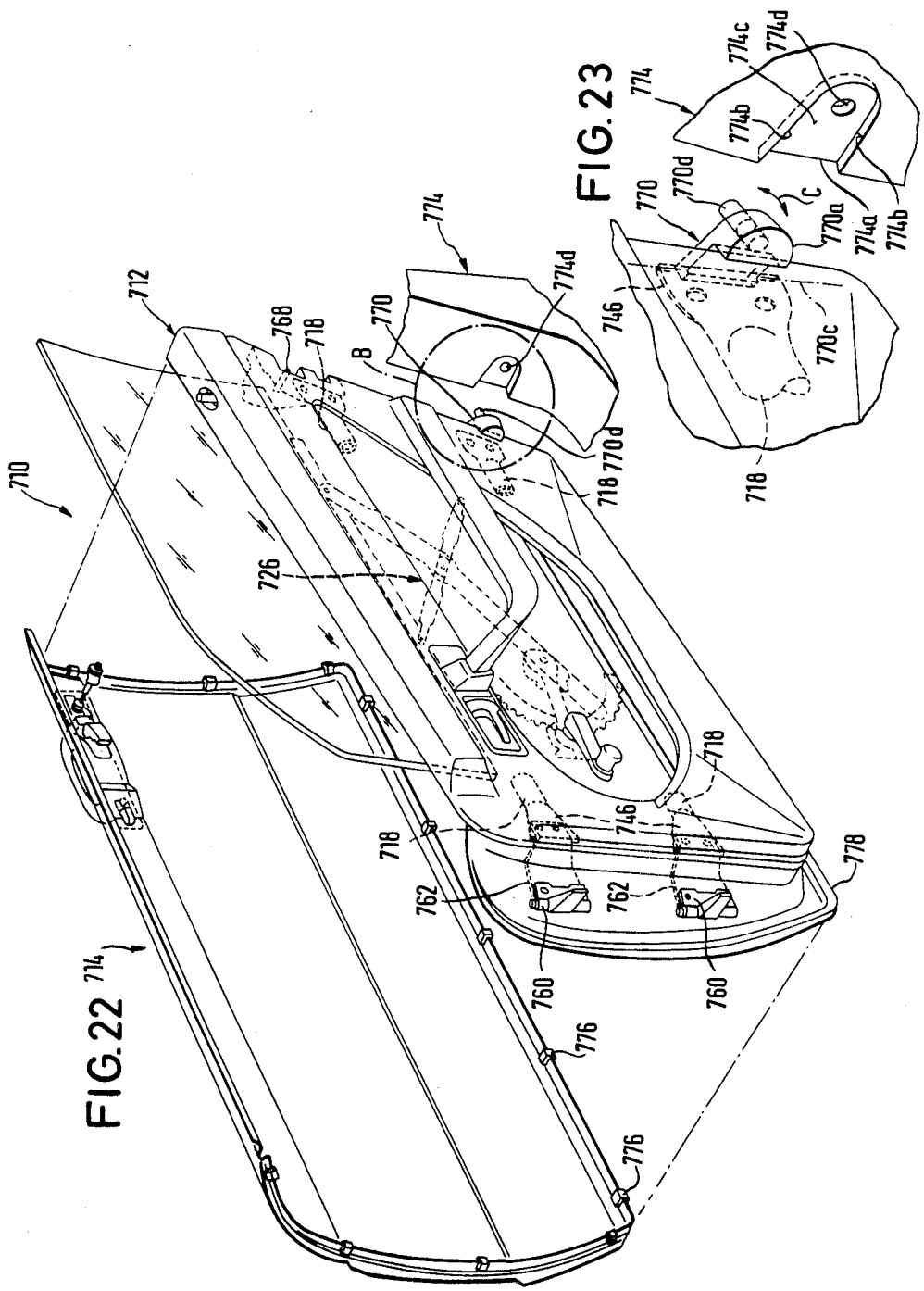

DOOR UNIT FOR MOTOR VEHICLES

BACKGROUND OF THE INVENTION

Conventional vehicle doors consist of an outer shell, an inner shell welded to said outer shell, and an inner lining mounted on said inner shell. The inner shell and the inner lining form the inner wall. The inner shell is provided with built-in apertures for the introduction of the window winding parts into the inner cavity between the outer and the inner shells. Said window winding parts are preassembled on a base plate, which is then disposed in the inner cavity of the door on the inner shell. Thus installation of the window winder in the door wells formed by the welded sheets of the outer and inner shells is carried out on the vehicle on the main assembly line. The installation and adjustment of the window winder through the relatively small built-in aperture is however time-consuming, so that a correspondingly long timed interval is needed for this assembly step and thus a correspondingly slower working speed for the main assembly line. The installation of the window winder as well as its subsequent adjustment is labor intensive and laborious, and it can only be done by skilled labor. Assembly by robots of the window winder is to be excluded.

SUMMARY OF THE INVENTION

The invention relates to a door unit for motor vehicles comprising an outer wall optionally formed by the outer shell, an inner wall as well as built-in aggregate parts disposed between said outer and inner walls, especially a window winder for a window pane.

The primary object of the invention is to make available a door unit for motor vehicles of the type named above with substantially reduced manufacturing costs.

A further object of the present invention is to ensure that the unit carrier provides improved protection against lateral and frontal impact forces.

In accordance with the invention a unit carrier is provided forming at least a part of the inner wall while said carrier can be provided with the built-in unit parts before assembly takes place with the outer wall. The unit carrier can be provided with the desired built-in units, especially the window winder, wholly independent by of the main assembly line, e.g. on an ancillary assembly line or even in a different plant. The unit parts can be premolded in the unit carrier. The preassembly of the unit parts on the unit carrier can be performed due to the unrestricted access provided to the place of assembly on the unit carrier by assembly robots as well. The above mentioned base plate for the window winder can be totally omitted. The unit carrier can, without problems, be designed so that on it all the various types of window winder under consideration can be mounted, including window winders of complicated design, which cannot be fitted in the conventional vehicle doors because of the unfavorable assembly conditions. The decision as to with which built-in unit the vehicle doors are finally to be equipped can be taken relatively late, at latest directly before the assembly of the unit carrier with the outer wall. Thus on the main assembly line only the unit carrier has to be assembled with the outer wall and the final adjustment of the preadjusted built-in unit has to be done on the unit carrier.

Optionally the final adjustment, e.g. of the window winder, can be omitted, i.e. when the unit carrier is premounted complete with window pane and window frame. The material cost for the door unit of the invention is reduced as compared with conventional vehicle doors with double-walled prefabricated door bodies, since the inner shell is wholly superflous; correspondingly the total weight of the vehicle doors is reduced.

The vehicle doors are of especially simple design when the outer shell is secured directly on the unit carrier. The door is thus substantially made in two parts.

A vehicle door of increased mechanical stability is obtained when between the outer shell and the unit carrier, a preferably box-shaped door frame is located. The vehicle door accordingly is substantially made in three parts. The door frame can, before assembly, be welded or rabbeted with its unit carrier to the outer shell, which facilitates the handling of the outer shell during assembly on the main assembly line.

The window frame can be secured on the door frame or on the unit carrier, and this can be done before or during the assembly of the unit carrier with the outer shell.

The requisite mechanical stability of the unit carrier is ensured when it comprises at least one full length carrier plate of sheet steel or of plastic, preferably of SMC( synthetic resin mat of glass fiber reinforced polyester resin).

In the assembly of conventional vehicle doors, after the installation of the window winder, a vehicle inner lining has to be secured on the inner shell, in order to give the vehicle door a pleasing appearance toward the door's inner cavity. Also the built-in apertures must be covered. This assembly step which conventionally is to be performed on the main assembly line can either be done in advance or can be dispensed with, when in a preferred embodiment of the invention, the unit carrier before its assembly with the outer shell is provided on its inner side facing the vehicle interior with an inner lining, preferably in the form of a separate or foamed foam layer, which is preferably covered with material and/or flocked.

To reduce the danger of injury to the passengers during an accident it is proposed that the unit carrier be provided with preferably foamed impact cushions. Moreover parts of the seat, especially the lateral guide cushions, can be arranged on the unit carrier.

The assembly of parts of the built-in unit can be performed especially rapidly and simply when these parts can be clipped to the unit carrier. However cases are conceivable in which parts of the built-in unit have only to be placed in the unit carrier or in which the parts are premolded in said unit carrier. The formation of the corresponding cavities in the unit carrier is preferably carried out using correspondingly molded cores.

Especially simple and robot-oriented preassembly of the built-in unit parts is ensured when, according to the invention the parts of the built-in unit can at least to a large extent be assembled from that side of the unit carrier which side facing the outer shell after assembly of the unit carrier with said outer shell.

To facilitate repairs of unit parts it is suggested that the unit carrier should be detachably connected with the outer shell and/or with the door frame. To do this the unit carrier can be clipped and/or riveted and/or screwed to the outer shell and/or to the door frame.

It is proposed that the unit carrier should be connected with the outer shell or with the door frame by means of an approximately U-shaped peripheral rabbet (seen in cross-section) on one of the parts for the reception of the peripheral edge of the other corresponding part, which provides mechanical stability. Further in the peripheral rabbet a seal can be inserted to prevent the penetration of spray into the interior of the door. Furthermore parts of clips can be inserted in said peripheral rabbet.

In the known vehicle doors, during assembly on the main assembly line, and after the attachment of the inner lining, frequently a separate armrest and/or a pocket are disposed on the inner lining. This assembly step can be transferred to the ancillary assembly line or even omitted entirely, when on the inside of the unit carrier, before its assembly with the outer shell or the door frame, an armrest and/or a pocket is (are) mounted or molded. Additionally it can be provided that the unit carrier is formed with a receptacle aperture, preferably in the armrest, for an ashtray and/or a cigarette lighter which are optionally fitted later. Further the unit carrier can be provided with a receptacle aperture for a loudspeaker and/or for switches, especially for seat adjustment, which are optionally fitted later. To facilitate the subsequent fitting of equipment it is proposed that on the unit carrier covers for receptacle apertures for the unit parts to be fitted later should be detachably arranged, preferably by means of planned weak lines.

When actuating the window winder, especially on final impact of the window pane, there are frequently large mechanical forces caused, which in the known vehicle doors often lead to a deformation of the carrier for the window winder, especially of the base plate and inner shell in the area of the securing point for the base plate. This leads to increased wear on the window winder and to a correspondingly reduced service life thereof. Such deformations are avoided according to the invention in that the unit carrier is provided with reinforcing means preferably with reinforcing ribs.

Preferably two reinforcing tubes can be provided which are molded into the unit carrier or are inserted in corresponding channels of the unit carrier. This measure ensures protection against deformations of the passenger compartment during lateral or frontal collisions.

One end of the reinforcing tube can be formed with a hinged base and the other end with a first lock base. Thus the forces arising in the event of impact can be transferred without any problems to the A column and the B column of the vehicle. Apart from that a solid securing point is obtained for the hinge and/or the lock so that the unit carrier furthermore need not be made of quite such stable material. Lastly there is the possibility of adjusting the hinge and lock during preassembly on the unit carrier.

In a preferred embodiment of the invention, at least one hinge base part or lock base part connected with the corresponding tube end and preferably partly inserted therein is provided. To improve the rigid coupling between the door frame and the unit carrier at least one of the inserted base parts is secured on the box profile of the door frame optionally by using a support fin.

For the fast reciprocal adjustment of the base part and door frame or outer shell, fixing plugs are provided which pass through these parts.

It is proposed that the preferably box-type lock base part should bear at least parts of a lock mechanism and/or a snap cone so that these parts do not have to be fitted on the main assembly line.

During assembly of the window winder of conventional vehicle doors, first the window pane is lowered into the window slit of the door well formed by the outer and inner shells and then later the actual window winder is assembled in the door interior, while the window pane has to be raised and lastly connected with the window winder. These operations are wholly dispensed with on the main assembly line when, as inventively proposed, the unit carrier can be equipped, before assembly with the outer shell or the door frame, with its window winder and its pane.

In many types of vehicle the customer can choose between manual and motor-driven window winders. Here a uniform unit carrier suffices, if it can be fitted optionally with a manual or motor-driven window winder. The unit carrier can be fitted with a common gear part for both manual or motorized operation of the window winder, which cuts the assembly and production costs.

One can dispense with the brake housing for the loop spring brake of the manually actuated window winder, when the unit carrier is designed with a molded brake housing. One easily avoids the escape of the drive segment of the window winder gear which enmeshes with the drive pinion when the unit carrier is provided with a molded guide for this drive segment.

The relatively thick window winder gear motor can well be accommodated in the vehicle door when the unit carrier is designed with a molded receptacle for said gear motor.

A gear housing or base plate can be omitted when the unit carrier is fitted with rotary bearings for the window winder gear parts, espcially with a rotary bearing for a cog segment bearing a lifting arm and for a pinon enmeshing with said cog segment, preferably in the form of a corresponding bed plate supporting a corresponding bed bolt, while said bed plate is connected with the unit carrier, preferably by pressing to it.

To raise the mechanical stability of the gear a counter bed plate substantially parallel to the bed plate but spaced therefrom is provided, on which the bed bolts of the bed plate and preferably a drive pinion of the window winder gear motor are mounted.

The unit carrier can also be fitted with a guide groove for a roller or a slide ring of a window winding arm. One dispenses with a separate lateral window guide rail when the unit carrier is designed with at least one molded lateral window guide.

If an adjustment of the window guidance is desired, it is proposed that the unit carrier should be made with at least one adjustable lateral window guide, preferably in the form of a guide rail, which is hinged at one of its ends on a bolt formed on the unit carrier and which on its other end is adjustable by means of a screwed rod mounted on the unit carrier and extending transversely to said guide rail.

To seal the door interior in the area of the window pane externally it is proposed that on the unit carrier at least one and preferably two parallel sealing lips next to each other should be provided abutting the window pane.

Furthermore on the unit carrier control surfaces can be provided for control of the window winder motion, which are mainly used for vehicle doors without window frames (the top window frame part is lacking).

Other unit parts apart from the window winder parts can be preassembled on the unit carrier, e.g. parts of a pneumatic control, especially for central locking. In this case the unit carrier is fitted with at least one air lead for the pneumatic control. Simple connection of this air lead to the next lead is ensured by elastic coupling muffs arranged on the end of the air lead. The unit carrier can also be provided with a pneumatic reverse switch element for the actuation of the lock.

The door provides a pleasing appearance when the unit carrier is designed with panel-type stampings in the range of operating parts, e.g. an inner door opening catch or a safety button; moreover the fouling of the possibly sensitive inner lining cover is avoided. The special metal panels provided for known vehicle doors can then be omitted.

The unit carrier can be formed in many ways, especially if it is made of a continuous carrier plate of plastic.

The unit carrier can be provided with heating channels for the heating and cooling medium, preferably in the form of flat hollow profiles adjacent to each other. On the unit carrier respectively halves of the hollow profiles can be formed, which are respectively covered by the other half of the hollow profile, preferably in the form of a corresponding embossed foil. To attain the maximal heat radiation it is proposed that the foil should be equipped with a metal coating on the foil side facing the vehicle's interior. The unit carrier can also be provided with window heating, preferably in the form of a channel fitted with air exit apertures.

Furthermore the parts of the electrical built-in unit can also be integrated in the unit carrier. The costly laying of electrical leads is simplified when the unit carrier is provided with preassembled electrical leads of which at least a part preferably runs through the reinforcing tube. The connection with the further electrical leads is simplified when the unit carrier is designed with recesses for the reception of electrical plugs. Here one can also ensure that these recesses are protected against spray in order to exclude damage to the leads for this reason.

The unit carrier can be fitted with a plug-in lamp and/or an interior lamp.

To an increasing extent electronic components are built into the vehicles. To use the door's interior for them, the unit carrier can be equipped with recesses for electronic components which may be fitted later, e.g. for a control unit for a window winder. To avoid reliably a thermal build-up during the operation of these electronic components, it is proposed that the recesses are dimensioned and preferably connected with a cavity between the unit carrier and the outer shell so that adequate cooling for the built-in electronic components is ensured.

In an advantageous embodiment of the invention, the reinforcing means of the unit carrier is also designed as a second lock base for a second locking arrangement on the door side which interacts with a second locking arrangement on the frame side. The latter arrangement ensures that the vehicle door is not only fixed on the A column via two force action points(via the two hinges) but that it is also fixed when the door is closed-to the B column via two force action points. Thus lateral and frontal impact forces can be diverted into the columns with substantially lower danger of deformation of the reinforcing means.

In an especially stable and also economically manufactured embodiment of the invention, it is provided that the unit carrier is fitted with two reinforcing tubes, the one end of each is designed as the base for the door hinges while the other end of each is used as the base for one of the two locking arrangements on the door side.

To couple the door hinges in the area of the vehicle door rim arranged on a sheet metal apron or the like in mechanically stable manner with the reinforcing tubes extending in the adjacent thicker door area, it is provided that the door hinge is connected with a base part inserted in one tube end or with the flat pressed end of said reinforcing tube, via an optionally multi-angled connecting link. It is proposed that the connecting link and the door hinge should be arranged on opposite sides on a support layer formed on the unit carrier or on the door frame. Thus the link is not visible, which improves the appearance of the inside of the door.

In another embodiment of the invention the door hinge part on the door side is angled and arranged on one edge of a box-shaped door frame inserted between the unit carrier and the outer shell. This arrangement is especially robust. Moreover the connecting link can be omitted when the door hinge part on the door side is directly connected with a base part inserted in the corresponding tube end or with the flat pressed end of said reinforcing tube.

The assembly of the unit carrier and the door frame after the preassembly of the built-in unit parts is facilitated by engagement blocks on the unit carrier which interact with complementary blocks on the door frame.

To provide for a reliable connection between the second locking arrangements on the door side and on the frame side with a simple assembly, it is proposed that the second locking arrangement on the door side should comprise a locking bolt projecting from a pivot plate which is movable when the door is closed into a bolt hole of the door frame.

In an alternative embodiment of the invention it is proposed that the second locking arrangement on the door side should comprise a pivotably mounted locking fork which when the door is closed is encountered by a locking bolt rigidly mounted on the door frame and is pivoted so as to be blockable in a locked position corresponding to the closed position of the door. Here it can be arranged that the second locking arrangement on the door side comprises a guide fork rigidly secured on the door, and next to the locking fork while said guide fork is open in the closing direction of the door and grasps the locking bolt when the door is closed.

The unit carrier can be designed to be reinforced so that separate reinforcing elements such as reinforcing tubes are not required. In an especially economical embodiment of this type of the invention, it is proposed that the unit carrier is formed by an elongated and per se reinforced carrier plate which at one end is designed as the securing base for the locking arrangement on the door side and on the wider other end is designed as the securing base for at least two mutually spaced door hinges. A reinforcing part to be inserted in the vehicle door which is designed as a securing base both for the locking arrangement on the door side as well as for at least two mutually spaced door hinges is certainly known per se from U.S. Pat. No. 3,782,036. This part however, by contrast with the invention, is not intended as the unit carrier, which substantially increases the material and assembly costs as well as the door's weight.

It is proposed that the unit carrier should be provided with an open stamped receptacle on one plate side, preferably on the inside facing the vehicle's interior, for a window winder drive motor and with a aperture accessible from the other plate side for the passage of a drive element, especially a cog sector of a window winder mechanism which can be secured on the other side of the unit carrier, especially a window winder cross. Thus it is only necessary for the drive motor to be mounted from one side and the drive element, optionally the cog sector to be mounted from the other side on the unit carrier, whereby automatically the mutual engagement of the drive motor and the drive element is ensured. The stamped receptacle contributes to an increase in the mechanical stability of the unit carrier.

For housing the window winder mechanism comprising two arms linked together in crossing relationship on the unit carrier it is suggested that that arm which supports the cog sector should be hinged on the unit carrier and that one end of the other arm should be displaceably mounted in an elongated slit of the unit carrier.

To reduce the transfer of drive noise from the window winder mechanism to the outer and/or inner walls, it is suggested that the unit carrier is connected with the outer wall and/or the inner wall, optionally with the inner lining in the area of the rotary bearing of the arm supporting the cog sector via an elastic and preferably antioscillation element.

For the preassembly of the lateral pane guide on the unit carrier, at least one link projecting from the unit carrier is provided for the fastening of the window pane guide on the unit carrier.

Further it is suggested that the end of the unit carrier with smaller width should be angled to secure a lock arrangement, and provided with a passage via which when the door is closed, the lock arrangement on the door side and the bolt arrangement on the frame side can mutually engage. The lock arrangement is protected in the angle at the end of the unit carrier against damage or pollution.

It is proposed that the unit carrier should be formed as a pressure die cast metal part or as a sheet-stamped part, while the unit carrier can be provided on its two longitudinal edges respectively with a reinforcement. At relatively low weight the required mechanical strength of the unit carrier is ensured. The reinforcement for the edges is preferably in the form of a U-shaped rimstrip.

The invention also concerns a process for the manufacture and assembly of a door unit for vehicles in which the unit carrier is preassembled on an ancillary assembly line with the built-in unit parts, especially with a window winder and finally it is connected with the inner wall and/or the inner lining and preferably also with the outer wall, and then this part of the body is supplied to the main assembly line, final assembly takes place and final adjustments are made. Since the preassembly is carried out on the ancillary line, the door assembly on the main assembly line requires a particularly brief work time.

During preassembly the window winder can be adjusted to the window pane on the unit carrier, which causes a corresponding time saving on the main assembly line. For the same reason it is proposed that before end-assembly the door lock should be fitted on the unit carrier.

The various features of novelty which characterize the invention are noted with particularity in the claims annexed to and forming a part of this disclosure. For better understanding of the invention, its operating advantages and specific objects attained by its use, reference should be made to the drawings enclosed and descriptive matter which illustrate and describe preferred embodiments of the invention.

BRIEF DESCRIPTION OF THE DRAWINGS

FIG. 6 is a section along the line VI—VI in FIG. 3;

FIG. 7 is a section along the line VII—VII in FIG. 3;

FIG. 10 is a section along the line X—X in FIG. 3;

FIG. 11 is a section along the line XI—XI in FIG. 3;

FIG. 12 is a section along the line XII—XII in FIG. 3;

FIG. 16 is an assembly diagram for a further embodiment of the door unit;

FIG. 17 is a detailed section along the line XVII—XVII of the assembled door unit according to FIG. 16;

FIG. 18 is a detailed section of the assembled vehicle door according to FIG. 16 along the line XVIII—XVIII;

FIG. 19 is a view of the peripheral edge of the outer shell in the area of the section in FIG. 18 in the direction of arrow XIX;

FIG. 20 is a view corresponding to FIG. 19 of a clip part which is sectioned in FIG. 18;

FIG. 21 is a simplified cut away drawing of an inventive door unit;

FIG. 21A is a section corresponding to the section A in FIG. 21 of a modified embodiment;

FIG. 22 is a detailed drawing of a further embodiment of an inventive vehicle door unit;

FIG. 23 is a detailed drawing of section B in FIG. 22;

In the case of the vehicle door units described below the invention concerns automobile doors, even though other types of use can be considered, e.g. aircraft or ship doors. All the embodiments have the unit carrier in common, which permits the preassembly of important built-in unit parts such as a window winder with or without the window pane, and permits this without presence of the actual vehicle, and in the case of an automobile, independently of the main assembly line. FIG. 1 shows purely schematically such a door unit 10 for vehicles. The above unit carrier 12 has already been preassembled, and is especially provided with a window winder designated in general by 13. Said unit carrier 12 is mounted on a door frame 14 made of a U-shaped bent box profile, e.g. it is riveted or screwed in place. Corresponding securing screws 16 are shown in FIG. 1. On the other side of the door frame 14 the outer shell 16 is disposed in the door, especially by the folding of the corresponding peripheral edges. In the case of a door with window frame, the latter has to be secured on the door 10, e.g. on the door frame 14. Lastly a window pane 20 has to be inserted in the lateral guide rails 24 on the unit carrier 12 and connected via a winding rail 22 on the lower pane transverse edge with the window winder 13. The insertion of the window 20 is done before the connection of the unit carrier 12 and the door frame 14.

FIG. 2 shows the assembly of a second embodiment of the inventive vehicle door unit in a simplified representation during assembly; FIGS. 3 to 12 show detailed views of this door marked 110.

The door 110 like the door 10 in FIG. 1 is made in 3 parts; i.e. it consists of the unit carrier 112, the door frame 114, as well as the outer shell 116. The door 110 is designed without a window frame; but if necessary, it can be fitted with one. In FIG. 2 the broken outline shows such a window frame, which however as opposed to FIG. 1 is mounted on the unit carrier 112. The window pane 120 is also already mounted on the preassembled unit carrier 112.

As can be seen especially clearly in FIGS. 4, 5 and 7 the unit carrier consists of a continuous carrier plate 124 made of SMC (synthetic resin mat of glass fiber-reinforced polyester resin), which has a foamed foam material layer 126 on the inside facing the vehicle compartment. The foam layer 126 is in its turn flocked or covered with fabric. In the area of the lower half of the unit carrier 112 there is a pocket 128; the front wall 130 extending upwards of this pocket 128 is in turn also foamed. The front wall 130 continues downwards in a vertical rim strip 132, which when the door is assembled covers a corresponding vertical wall of the lower horizontal leg 134 of the door frame 114 snugly. FIG. 4 shows with the dash-dotted lines both the door frame 114 as well as the outer shell 116. FIG. 5 shows a section through an armrest 136, which is formed by a foamed ledge 138 which is integrally molded with the carrier plate 124 and projects from it. The interrupted lines show two reinforcing ribs 140 in the vertical plane. which extend in a vertical plane in the upper and lower chamber respectively extending between the ledge 138 and the carrier plate 124. The carrier plate 124 can be reinforced where desirable by such reinforcing ribs 140.

The arm rest 136 can also be fitted with an ashtray (not shown) as well as a cigarette lighter.

Figure 3:
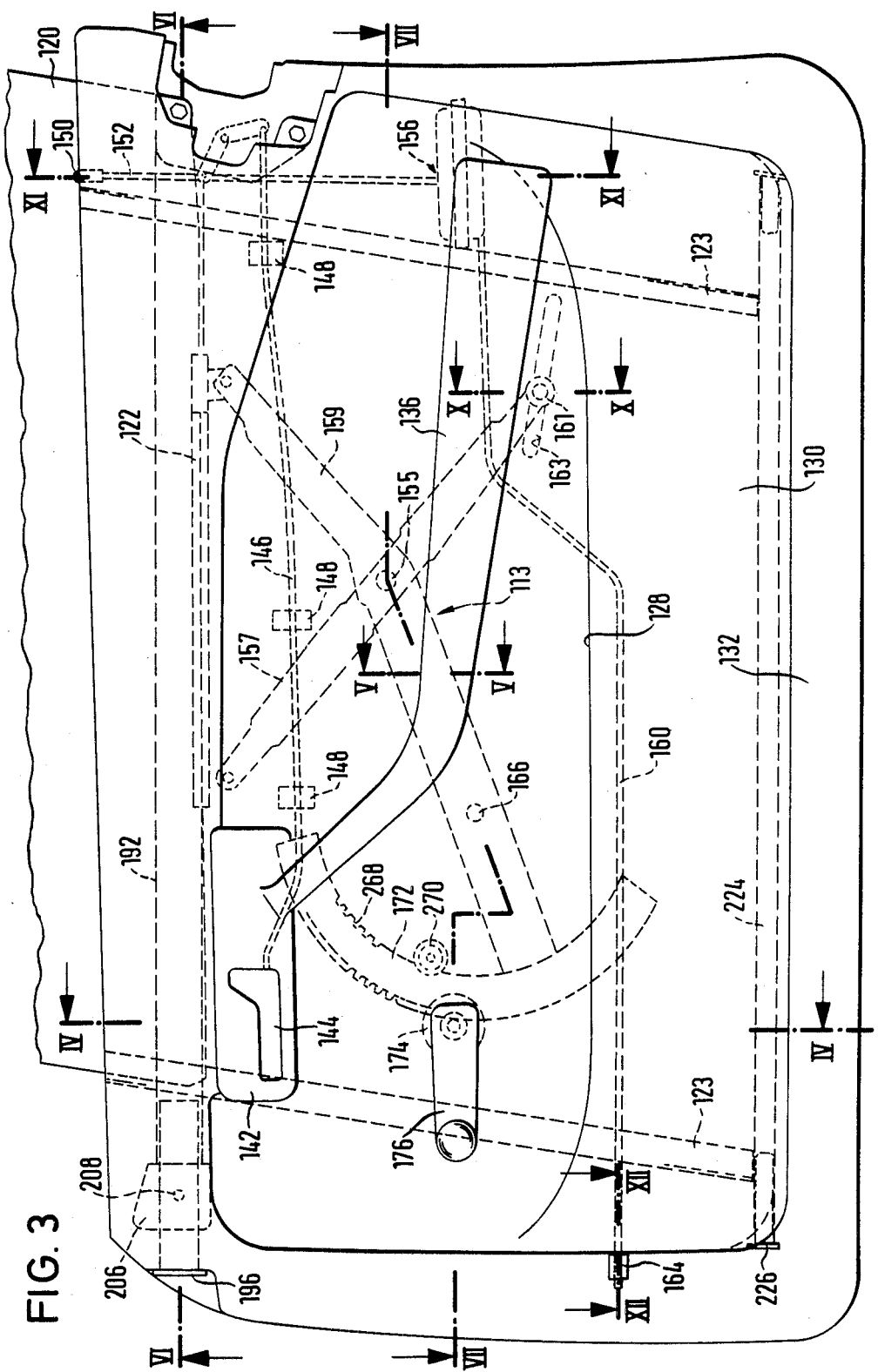
FIG. 3 is a view of a unit carrier of the door in FIG. 2 seen from the interior of the vehicle.
Figure 4:
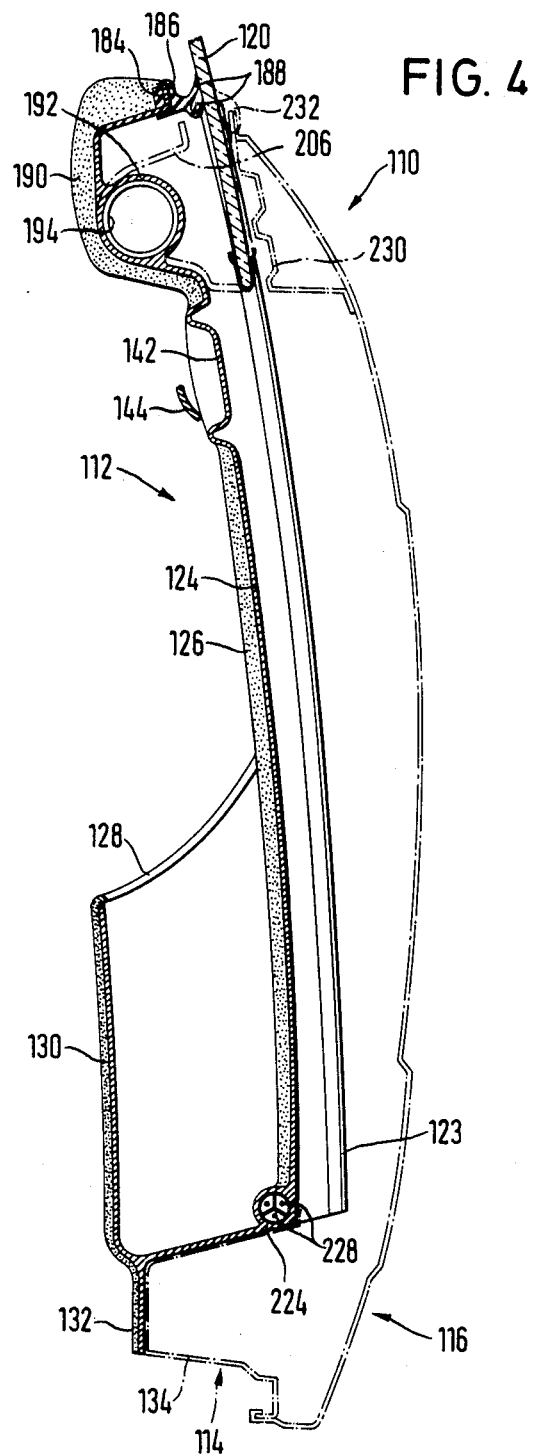
FIG. 4 is a section of the unit carrier along the line IV—IV in FIG. 3.
Figure 5:
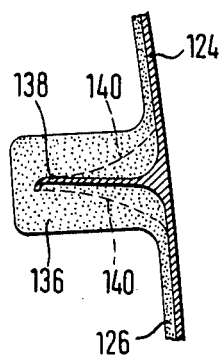
FIG. 5 is a detailed section along the line V—V in FIG. 3.

FIGS. 3 and 4 show a grip 142 in the carrier plate 124 for an inner door latch 144. In the area of this grip 142 the foam layer 126 is interrupted. A lock actuating rod 146 leads from the door latch 144 to the door lock (not shown). To guide this rod 146 there are rod guide elements(only schematically shown) on the carrier plate 124 in FIG. 3.

Figure 2:
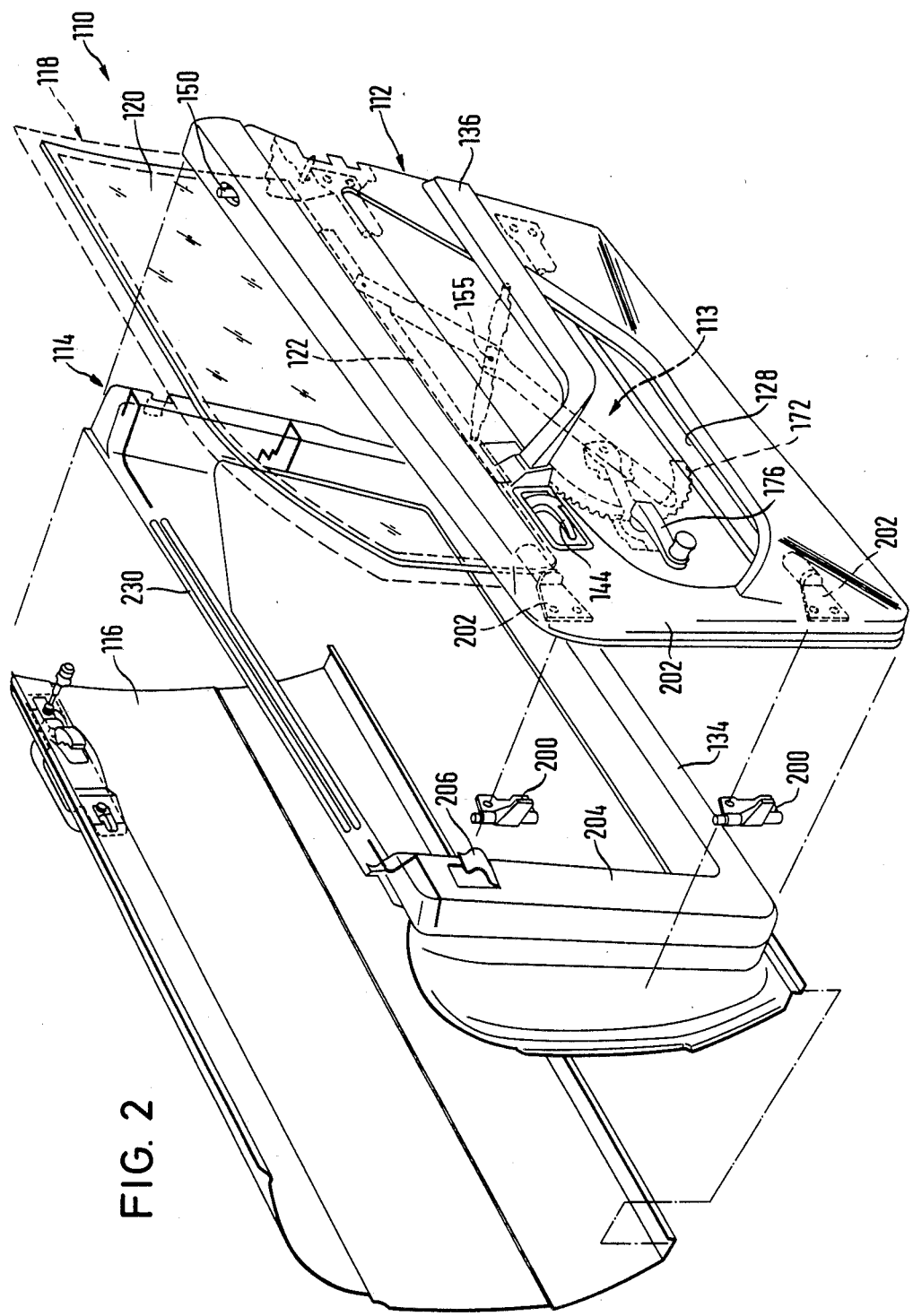
FIG. 2 is an assembly plan for a second door embodiment.

The locking of the lock from inside the vehicle is performed by a safety-knob 150 visible in FIGS. 2, 3 and 11, which is connected with the lock via a second lock actuating rod. On the opposite end of rod 152 there is a membrane 154 of a pneumatic reverse switch 156, secured via a plate 158. The reverse switch 156 is part of a pneumatic central locking composed of a controllable low pressure source (not shown) and such reverse switch elements on every door, which are connected by air lines to the low pressure source. Such an air line is shown in FIGS. 3 and 12, marked 160. To connect the individual airlines with each other, e.g. the line 160 of the door 110 and the line 162 coming from the A column according to FIG. 12 there are elastic coupling muffs 164. As soon as there is a vacuum in the line 160, a corresponding vacuum is built up within the reverse switch 156 below the membrane 154 so that the lock actuating rod 152 is drawn into the final lower position shown in FIG. 11, in which the lock is bolted and the safety knob 150 adopts its bottom position. For unlocking either there must be excess pressure on the line 160 or the respective safety knob 150 must be moved, or the lock must be unlocked from outside.

Figure 8:
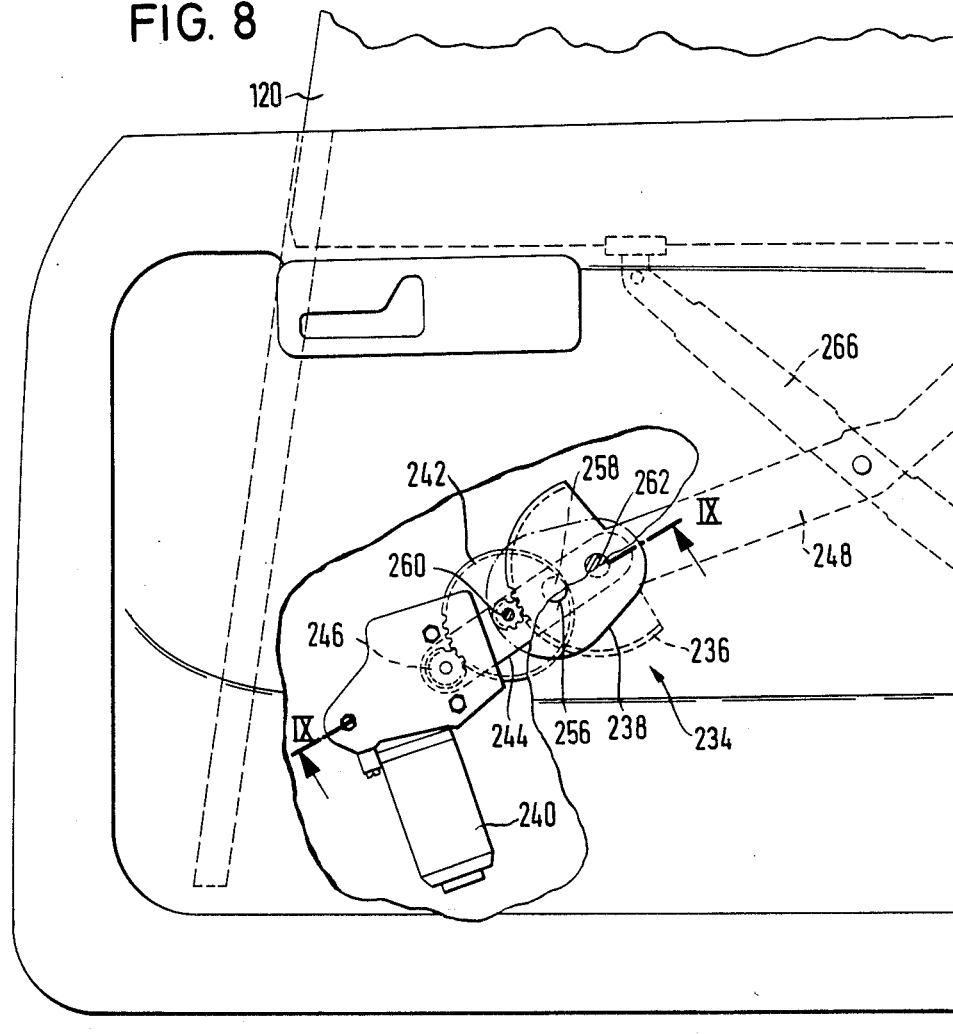
FIG. 8 is a partial view of the unit carrier according to FIGS. 3 to 7 but with motor driven window winder instead of the manual type, seen from the inside of the vehicle.
Figure 9:
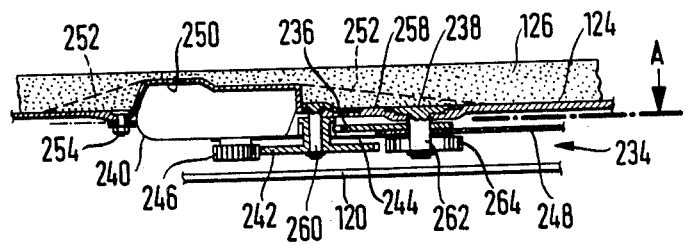
FIG. 9 is a section along the line IX—IX in FIG. 8.

The unit carrier 112 is provided, before assembly on the main assembly line with the outer shell 116 and the door frame 114, with a window winder, wherein a choice can be made between a manually actuated window winder (FIG. 2, 3, 7) or an electrically driven window winder (FIG. 8 and 9). The two window winder types have in common a window winder cross made of two winder arms 157 and 159 linked together in a rotary point 155 as well as a guide for the window pane 120 in the side rails 123 (FIGS. 4 and 7) formed on the bearing plate 124.

Both the winder arms 157 and 159 engage with one of their ends with the winder rail 122, while at least one winder arm is displaceably mounted along the winder rail 122. The other end of winder arm 157 is fitted with a roller 161 shown in FIG. 10, which rolls along a guide groove 163 in the bearing plate 124. The section in FIG. 10 shows moreover the air line 160 disposed on the bearing plate 124 which crosses smoothly into the base 165 of the housing of the reverse switch element 156 in FIG. 11.

The winder arm 159 is mounted on a rotary bearing bolt 166, which in turn is preferably rigidly secured as an insertion part on the unit carrier 124. FIG. 7 shows an insert plate 168 integral with said bolt on the lower bolt end in FIG. 7 which can be inserted in a corresponding flat recess in the bearing plate 124. FIG. 7 also shows a spiral spring 170 embracing the bearing bolt 166, which ensures that the window pane weight is compensated and acts between the bearing plate 124 and the winder arm 159.

On the end of the winder arm 159 remote from the winder rail 122, the arm 159 is provided with an arcuate cog segment 172 which enmeshes with a pinion 174. This pinion is in turn coupled via a claw coupling (not shown) having a loop spring brake to a crankhandle 176 on the inside of the unit carrier 112. To ensure that the cog segment 172 does not disengage but always remains enmeshed with the pinion 174, cog segment 172 is guided in the area of the pinion 174 by a protrusion 178 abutting the lower side of the sector 176 in FIG. 7 as well as by a guide link 180 on the other side which is bent in approximately Z shape. Protrusion 178 projects from a bowl-shaped brake housing 182 which surrounds the loop spring brake; said brake housing 182 as well as the guide link 180 are in turn formed (riveted or stamped) on an additional bearing plate 184 of the unit carrier 112 which in this area is double-shelled. The left-hand (FIG. 7) lateral guide 123 for the window is also fitted to this additional bearing plate 184.

Thus all the window winder parts apart from the crankhandle 176 can be assembled from the top (FIG. 7) outer side facing away from the vehicle cabin of the unit carrier 112 on the unit carrier 112, optionally using an assembly robot.

The window pane 120 can also be preassembled on the unit carrier 112 since the side guide rails 123 provide the necessary support. On the top, vertically-upward projecting transverse edge 184 of the bearing plate 124 there is a seal 186 with two parallel superimposed sealing lips 188 (see FIG. 4) abutting the inside of the window pane 120. In this top transverse edge area the bearing plate 124 is approximately box-shaped and curved inwardly and is provided with an especially thick foam layer marked 190 as an impact cushion. This is also shown in FIG. 11 for the area of the safety knob 150.

On the inside of this box-type curve of the bearing plate 124 there is a hollow cylindrical formation 192, into which the reinforcing tube 194 is inserted, as seen in FIGS. 4 and 6. On both ends of the reinforcing tube 194 respectively there is a base part with a tubular piece inserted, i.e. a hinge base part 196 in the left-hand tube end (FIG. 6) and a lock base part 198 in the right-hand end. The hinge base part 196 is the base for a door hinge shown in FIG. 2 as 200, while optionally a further angle 202 can be used to connect the two parts. From the vertical spar 204 of the door frame 114 next to the A column, a support lobe 206 projects which embraces the tubular hinge base part 196 on the inside of the base part 196 facing the vehicle cabin; as shown in FIG. 4 its free end is bent upwards. A fixing plug 208 seen in FIGS. 3 and 6 mounted on the bearing plate 124 passes through both the support lobe 206 and the hinge base part 196, thus ensuring a safe connection of these parts.

The lock base part 198 is designed as a box with a cylindrical piece 210 for insertion in the right-hand (FIG. 6) tube end of the reinforcing tube 194. A fixing plug 212 formed on the box passes through a corresponding plug aperture in the side spar 214 next to the B column of the door frame 114.

In the box 216 of the lock base part 198 there is the lock mechanism (not shown) as well as a snap cone 218 shown with broken lines in FIG. 6. In the area of this snap cone 218 the box 216 is open to engage a corresponding counter-part on the B column. A securing lobe 220 projecting from spar 214 in approximately L-shape is inserted in the gap between the box 216 and the bearing plate 124 and is connected rigidly with both parts by a fixing plug 222. When the door is closed, therefore the reinforcing tube 194 is clamped firmly between the A and the B columns and ensures like a cage that in the event of a crash the lateral or frontal forces are diverted directly in the mechanically especially stable A and B columns of the car body.

As shown in FIGS. 3 and 4, in the lower edge area of the unit carrier 112, a reinforcing tube can also be provided 224 which is formed in a correspondingly tubular formation on the bearing plate 124 in the area of the base of the pocket 128. On its end near the A column (at left in FIG. 3) again a hinge base part 226 is inserted.

The reinforcing tube 224 can also be used as a pipe for electric cables as shown in FIG. 4.

On the unit carrier 112 further unit parts (not shown) can be mounted, e.g. an electronic control unit for the window winder or for adjustment of the nearest seat. These electronic components are inserted in corresponding recesses which are open toward the outside of the unit carrier 112 so that adequate cooling is ensured. For the connection of the already prepared and laid electrical leads the corresponding electrical plugs are provided. To control the motion of the window with a window-frameless door there are control surfaces on the unit carrier which interact with a control cam moved with the window pane. Further on the unit carrier an entry light or an interior light can be placed.

The preassembly of the unit carrier 112 is carried out independently of the main assembly line on an ancillary or preassembly line or optionally at a quite different factory. Further the outer shell 116 can also be independently joined to the door frame 114, away from the main assembly line. This can be done by the corresponding folding of the peripheral edges of the outer shell 116 around the peripheral edge of the door frame 114, as seen in FIGS. 2 and 4. It should be noted that the door frame 114 is closed by a top profiled transverse sheet 230 (FIG. 2) in contrast to the door frame 114 which is open at the top in FIG. 1. On the top edge of the transverse sheet 230 there is a sealing lip 232 being in contact with the outside of the window pane 120.

The unit carrier (with inserted reinforcing tubes 194 and 224 but without the base parts 196,198,206) is now laid on the door frame 114 and connected to it. This can be done by clipping, riveting or by screwing. In the area of the top reinforcing tube 194 there is formed a mechanically stable connection between the unit carrier 112 and the door frame 114 by the base parts 196 and 198 now inserted. For exact adjustment of the mutual fastening of the parts, fixing plugs 208,222 and 212 are provided. The two fixing plugs 208 and 222 integral with the bearing plate 124 are resiliently designed toward the outside of the unit carrier so that the base parts 196 and 198 can be inserted, until finally the plugs 208 and 222 latch into the corresponding plug apertures of the base parts 296 and 298.

The base parts 196,198 and 226 therefore adopt an exactly predetermined mutual position, so that a readjustment of the lock and hinge parts is only necessary to a minor degree, if at all.

The unit carrier 112 also permits the installation of an electrically driven window winder. This is shown in simplified form in FIGS. 8 and 9, marked 234. The winding cross is unchanged as far as the replacement of the arcuate cog segment 172 by an approximately semicircular cog sector 236. To clarify the design in FIG. 8 in the area of the bearing plate 238 the foam layer 126 has been omitted on the inside of the bearing plate 124, so that the baseplate 238 which is inserted from the inside and pressed onto the bearing plate 124 can be seen; moreover the bearing plate 124 in this area is partially cut away by the sectional line A (FIG. 9) extending directly on the outside of the bearing plate 124, so that a free view is provided of a window winder gear motor 240 and of an intermediate double cogwheel 242. A counter base plate 244 partly visible in FIG. 8 forms a base both for the motor pinion 246 of the gear motor 240 as well as for the double cogwheel 242, and also forms a rotational point for the winder arm 248 bearing the cog segment 236. The counter-baseplate 244 ensures adequate mechanical stability of the gear.

The window winder gear motor 240 is inserted in a receptacle 250 which largely encloses it and which is formed in the bearing plate 124. FIG. 9 shows by the interrupted line the reinforcing ribs 252. The gear motor 240 is screwed by means of a screw connection 254 passing through the peripheral flange of the motor on the bearing plate 124. The above mentioned baseplate 238 is approximately oval and has a central circular aperture 256 into which a corresponding projection 258 of the bearing plate 124 penetrates to form a positive connection after the pressing of the baseplate 238 onto said bearing plate 124. The baseplate 238 has two base bolts, a base bolt 262 for the winder arm 248 and a base bolt 260 for the double cogwheel 242. FIG. 9 shows a spiral spring 264 surrounding the base bolt 262, which in turn serves to compensate for the weight of the window pane 120.

The guide groove 162 for the lower end (not shown) of the winder arm 266 is unchanged, as are the lateral guide rails 123 for the window pane 120.

In a further embodiment (not shown), even with the electrical drive of the window winder, the winder arm cross composed of the winder arms 157 and 159 with the arcuate cog segment 172 can be taken over unaltered, when the drive pinion 270 of the window winder gear motor enmeshes directly with the cog sector 172, e.g. by the gear teeth 286 on the inside of the arc (FIG. 3).

Figure 13:
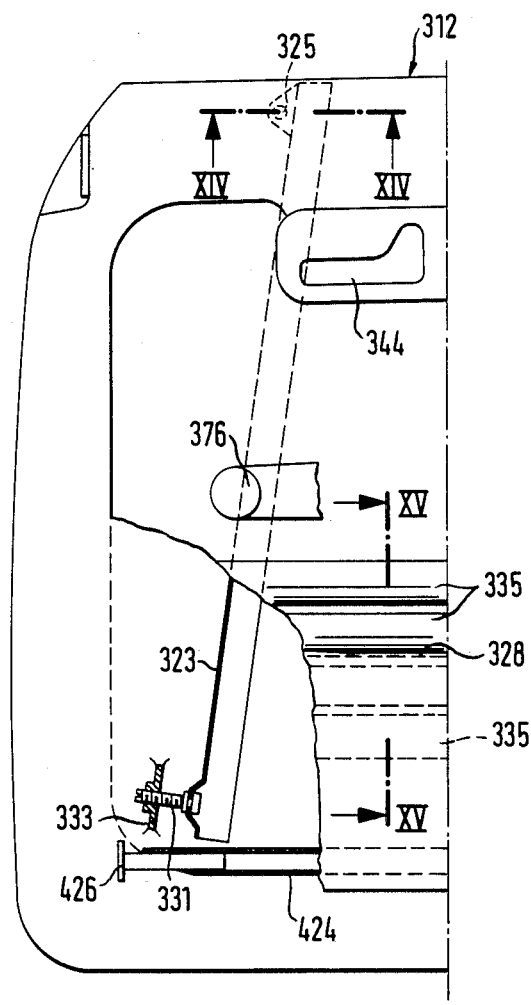
FIG. 13 is a detailed view like FIG. 8 of a further embodiment of the unit carrier.

FIG. 13 gives a partial view of a further embodiment of a unit carrier, marked 312.

Figure 14:
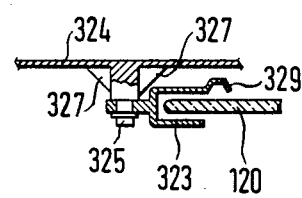
FIG. 14 is a detailed view along the line XIV-XIV.

This differs from the above unit carrier 112 in that the lateral guide rail 323 is adjustable, e.g. pivotable in the window pane plane. For this purpose the guide rail 323 is rotatably mounted at its upper end on a base bolt 325 which projects orthogonally from the bearing plate 324. Bolt 325 is formed on the bearing plate 324 and in turn is reinforced by reinforcing ribs 327, as seen in FIG. 14. One can also see the water drainage channel 329 of the guide rail 323 which forks around the window pane 120.

On the lower end of the guide rail 323 there is a threaded rod 331 in the window pane plane which is rotatably but not axially displaceably mounted on said guide rail 323. Said threaded rod 331 is additionally screwed into a thread of bar 333 which projects from said bearing plate. In twisting of the threaded rod 331, the guide rail 323 pivots in the plane of the pane far precise adjustment of the pane guidance.

Figure 15:
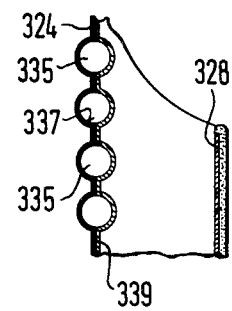
FIG. 15 is a detailed view along the line XV—XV.

Besides this feature the unit carrier 312 is constructed the same way as the above-mentioned unit carrier 112; FIG. 13 shows inter alia a crankhandle 376, an inner door opening lever 344, as well as (below) a reinforcing tube 424 with the inserted base hinge part 426. The only difference is that the unit carrier 312 has a heater in the area of the pocket 328. A plurality of parallel heating channels 335 which are superimposed are formed in parallel on the inside of the bearing plate 324. This plate 324 is formed on its inside with semi-cylindrical hollow profile halves 337 which are covered by a continuous foil 339, which in turn is stamped with hollow profile so that the cylindrical heating channels 335 shown in FIG. 15 are formed. The foil 339 can be provided with a metal coating to improve the heat radiation on the side facing the vehicle cabin. Such a heating channel can also be used to heat the window pane, especially when in the area of the top transverse edge of the unit carrier, a perforated hollow profile for hot air is arranged.

FIG. 16 shows a further embodiment of the vehicle door unit of the invention marked 510. Parts of the door 510 which correspond to those of door 110 are marked with the same reference numerals, increased by 400 in each case.

Figure 1:
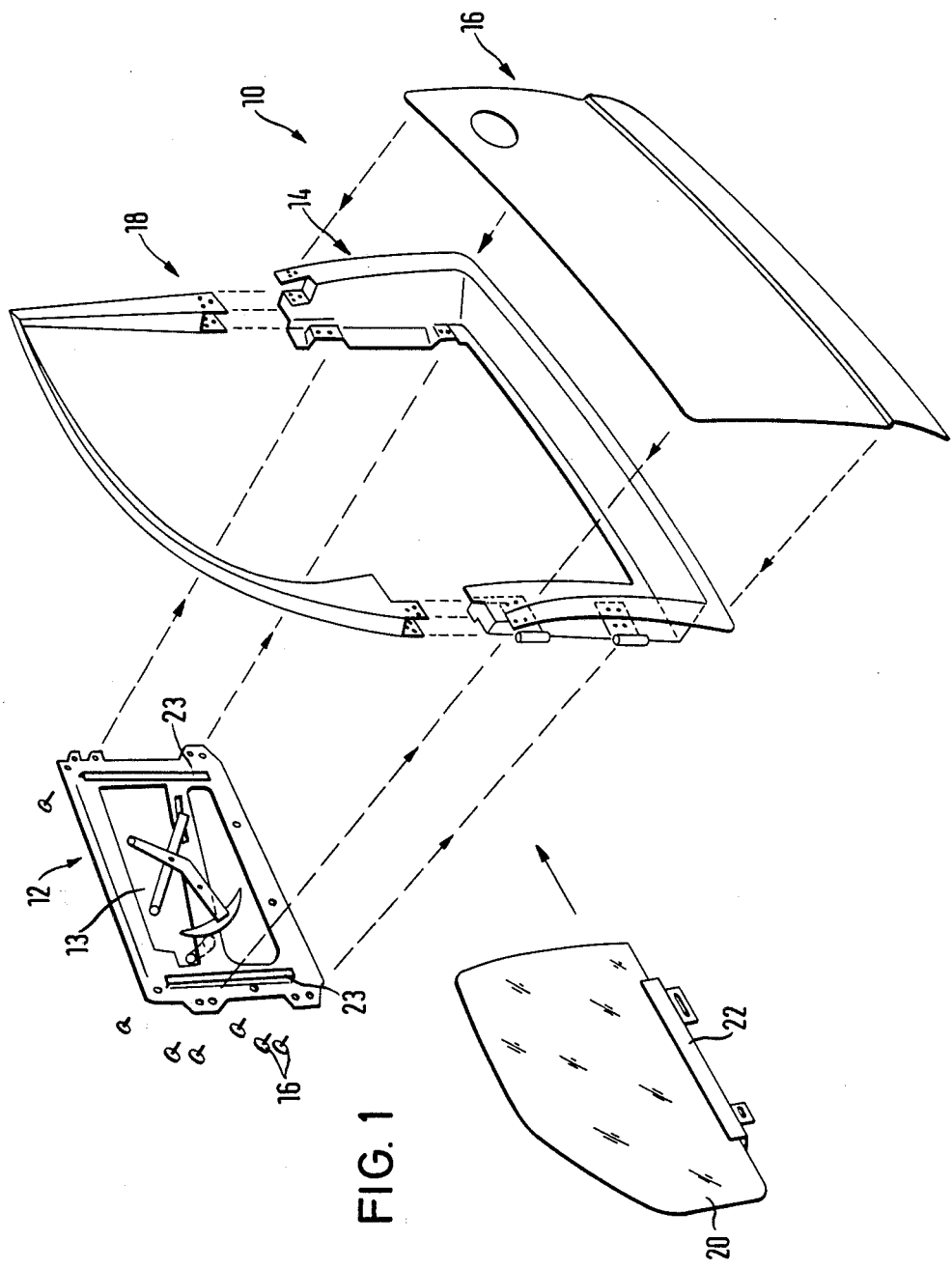
FIG. 1 is an assembly plan for a first embodiment of the inventive door unit for vehicles.

In contrast to door 10 of FIG. 1 or to door 110 of FIG. 2, the door 510 is essentially in two parts, since the outer shell 516 is mounted without an intermediate doorframe directly on the unit carrier 512. The latter can correspond in design to the unit carrier 112. For example one sees a window winder 513 which is driven by a crankhandle 576, but which can equally well be driven by a motor. The hinge base parts 596 and 626 are also inserted in the reinforcing tubes (not shown), on which the door hinges 600 can be assembled optionally by means of a connecting bracket.

To accept the peripheral edge 517 of the outer shell 516 the continuous bearing plate 524 of the unit carrier 512 is provided with an approximately U-shaped peripheral fold (seen in cross-section) 519. As shown in FIG. 17, a surrounding seal 521 which embraces the peripheral edge 517 of the outer shell 516 can also be inserted in the peripheral fold 519. To seal off the bottom transverse edge of door 510 against the vehicle body, a corresponding sealing lip 523 can be located on the unit carrier 512.

Should it be necessary after assembly of the door 510, e.g. for repair work, to be able to reach the unit parts on the outside of the unit carrier 512, the latter can be removed from the outer shell 516, since the two parts 516 and 512 are detachably connected by clipping, and/or riveting and/or by screwing to each other. FIG. 17 shows a securing screw 525 which passes through both the peripheral fold 519 as well as the peripheral edge 517. In FIGS. 18 to 20 a further option for fastening is shown, i.e. by means of the clip part 527 inserted in the peripheral fold 519. This clip part 527 consists of an approximately U-shaped clip with a downwardly arcuate (FIG. 18) semi-spherical stamp 531 in the top leg, which engages in a corresponding hole 533 of the peripheral edge 517 of the outer shell 516. To exclude the withdrawal of the clip part 527 from the peripheral fold 519, the spreader lobes 529 and 553 of the top or bottom leg of clip part 529 are supported on the inner walls of the peripheral fold 519. On the free end of the lower leg there are two angles 535 bent downwards which abut the edge of the peripheral fold 519 and ensure a defined positioning of the clip part 527 within the peripheral fold 519.

During assembly the clip part 527 is pushed onto the peripheral edge 517 of the outer shell 516 while the projection 531 latches into the hole 533; then the peripheral edge 517 is inserted in the peripheral fold 519. If repairs are needed, the clip connection can again be undone.

Figure 25:
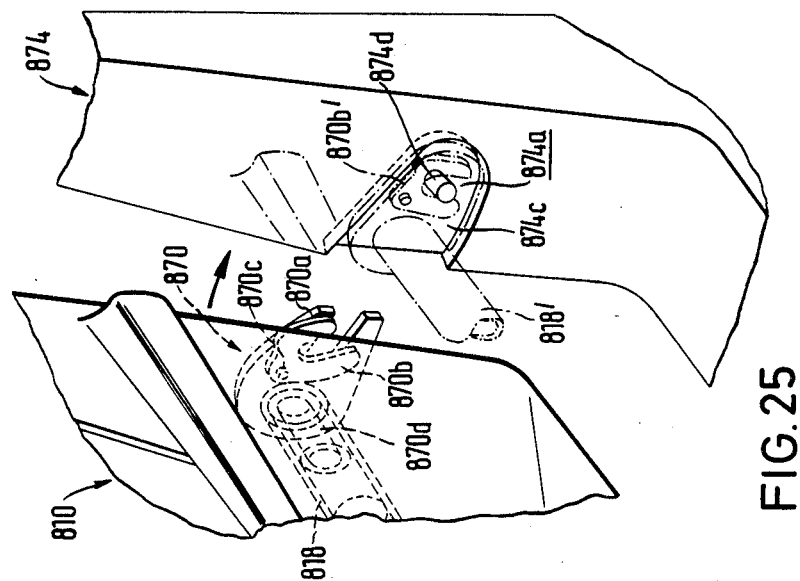
FIG. 25 is a view similar to FIG. 23 of the bottom end of the lock side of the unit carrier in FIG. 24.

The door units according to FIGS. 21-31 are also characterized in that their production is substantially facilitated in that the assembly and adjustment of the built-in unit parts, especially of the window winder, no longer has to be done on the body of the car on the main assembly line but can be done previously e.g. on an ancillary assembly line. The unit carrier used for this purpose marked as 612, 712,812 etc. in the figures is freely accessible from one side (FIGS. 22 to 25) or from both sides (FIGS. 21 and 27-31), so that the laborious insertion of the window winder parts through the entry aperture into the interior of a double-shelled door made of outer shell and inner shell is omitted. Since the unit carrier is itself stiffly built (FIGS. 26-31) or is provided with reinforcing elements (FIGS. 21-25) an adequately stable door body results after the assembly of the outer shell and the unit carrier designed as the inner wall (FIGS. 22-25) or after the assembly of the outer shell, unit carrier and inner lining (FIGS. 25-31) or after the assembly of the outer shell with the door frame, unit carrier and inner lining (FIG. 21). It is therefore not necessary to design the vehicle doors with a double-shelled box with outer shell and inner shell, which reduces the consumption of materials and correspondingly the total weight of the door. The unit carrier also has a further function, i.e. the reinforcement of the door side of the passenger compartment. As will be explained below the unit carrier serves as the securing base on the one hand for the door hinges on the A column (for front doors) or on the B column (for rear doors), and on the other hand as the securing base for the locking arrangement of the doorlock on the door side, and optionally for a second lower locking arrangement (FIGS. 23 and 25). Thus when the doors are closed, lateral impact forces are diverted from the stiff unit carrier directly to the two door columns on the two doors. In the same way frontal impact forces are led from the A column via the stiff unit carrier to the B column (front doors) or from the B column via the stiff unit carrier of the rear doors to the C column. The embodiments illustrated will be explained in more detail below.

The door unit 610 shown in FIG. 21 consists consecutively from the outside inwards of an outer shell 614, a door frame 616 with box profile, the unit carrier 612 with two horizontal reinforcing tubes 618, an inner lining 620, a window frame 622 to be mounted on the door frame 616, and a window pane 624.

The unit carrier 612 is already partly assembled, i.e. with a crossed arm window winder 626 and with lateral guide rails 628 for the window pane 624. The unit carrier 612 is designed as a rectangular frame with an additional center strut 630 slightly inclined to the horizontal, which serves as the rotary bearing for a drive pinion 632 as well as a rotary bearing for an arm 636 supporting the cog sector 634 of the window winder 626. Further in the strut 630 there is an elongated slit 638 for the guidance of the corresponding end of the other arm 640 of the crossed arm window winder 626. In the area of the four frame corners of the unit carrier 612 an embossed projection 642 is stamped projecting toward the outer shell 614 respectively, to which complementary engagement forms 644 of the frame 616 correspond. This facilitates the exact assembly of the unit carrier 612 and the door frame 616. The projections 642 further serve to accept the corresponding ends of the reinforcing tubes 618 from the inside of the unit carrier. This reduces the thickness of the vehicle door unit 610. As shown in FIG. 21 the hollow cylindrical reinforcing tubes 618 are each pressed flat at the two ends. These flat portions 646 are respectively provided with two holes 648 aligned with corresponding holes 650 and 652 of the unit carrier 612 or of the frame 616 as well as being aligned with screw-in sleeves (not shown) on the outside of the inner lining 620.

After suspension of the winder rail 654 mounted on the lower edge of the window pane 624 on the corresponding ends of the arms 636 and 640 of the window winder 626 and after threading the window pane 624 into the lateral guide rails 628 and after optional adjustment, e.g. of the guide rails 628, the unit carrier 612 can be assembled for further processing either with the lining 620 with the reinforcing tubes 618 interposed, or it can be assembled with the door frame 616, which optionally is provided either previously or later with the outer shell 614. But there is also the possibility, after adjustment of the window winder 626 with the pane 624 on the unit carrier 612, to join together the parts door frame 616 (optionally with the outer shell 614), unit carrier 612 with the reinforcing tubes 618 and the inner lining 620 simultaneously and to secure them to each other, e.g. by the insertion of the corresponding bolts from the outside in the aligned holes 652,650 and 648, and in the screw-in sleeves (not shown) of the inner lining 620. Either during this assembly step or before it the window frame 622 can be connected with the door frame 616, if desired in this type of door.

To do this the window frame 622 is fitted at both ends with fork-type securing links 656, which respectively embrace a corresponding projection 658 of aid door frame 616. For mutual fastening it is only necessary to insert the securing bolts, especially rivet bolts through the correspondingly aligned holes of the links 656 and projections 658 and then to fasten them.

The two reinforcing tubes 618 are connected with their front end in FIG. 21 respectively with a door hinge 660 and respectively via a multi-angled connecting link 662. They extend respectively on the outside of the door frame 616 and are therefore not visible when the door is finally assembled 610. The hinges 660 are arranged on an apron-like sheet section 664 which projects laterally from the actual box profile of the door frame 616. The connecting links 662 which extend respectively between the holes 652 and the hinges 660 are therefore approximately Z-angled. They are provided with securing holes (not shown) which align with the holes 652. Further they are rigidly connected in a manner not shown with the hinges 660, e.g. they are screwed through the sheet section 664. The above screw bolts for connection of the parts 616,612, 620 are then first inserted through the above holes of the connecting links 652, finally ensuring a rigid connection between the links 652 and the reinforcing tubes 618.

The inner lining 620 is provided with a door lock 666 which is schematically shown by the broken outline in FIG. 21, which however after the assembly of the parts 616,612 and 620 is connected by the corresponding bolts inserted through holes 652,650 and 648 directly with the top reinforcing tube 618, so that a direct force transfer path is formed from the door lock 666 or the locking arrangement 668 on the door side (e.g. a snap cone or the like) via the top reinforcing tube 618 and the top connecting link 662 to the top hinge 660. A further such force transfer path results between the second locking arrangement 670 disposed under locking arrangement 668 via the lower reinforcing tube 618 and the lower connecting link 662 to the lower door hinge 660. The second locking arrangement corresponds to that shown in FIG. 23 and to the locking arrangement to be explained in more detail below.

It must also be noted that the inner lining 620 can be made of SMC, i.e. of a synthetic resin mat of glass fiber reinforced polyester resin, which provides an advantageously low weight. Further the inner lining 620 can be designed on the inside with a foam upholstery. In FIG. 21 inter alia a window winder hand crank 672 is seen, which after assembly of the parts 612 and 620 is located on the shaft of the drive pinion 632. Instead of this crank drive, naturally a motor drive, especially by an electric motor, can be mounted as will be explained using the embodiment according to FIGS. 27 to 31. In the embodiment according to FIG. 21 of the invention, the window winder 626 is driven by a manual crank drive (drive pinion 632, manual crank 672). But instead of the manual crank drive a motor drive, especially electric motor drive, may be used. The decision on the type of drive can be made at a relatively late date since on the same unit carrier 612 the manual crank drive or the electric drive can be mounted and since the unit carrier 612 is easily accessible from at least one side until shortly before the connection of the outer shell 614 and the inner lining 620. After the largely automated assembly, especially by industrial robots, of the individual parts of the door 610, the type of window winder drive ordered by the customer can be built in accordingly, equally using industrial robots.

In the modification shown in FIG. 21A the two connecting links 662 are omitted, since the two door hinges 660' (of which the lower is shown in FIG. 21A) are secured above the holes 652 of the frame 616 and are equipped with holes 652', which align with the holes 652 in FIG. 21. So that the hinges 650' still reach far enough into the space formed between the apron type sheet section 664 and the actual box profile of the frame 616, the hinge part 661 on the door side is bent corresponding to the box profile and is set up on the corresponding edge 663 of the box profile. When the door is finally assembled the hinge 660' is connected directly via the corresponding securing bolts to the respective reinforcing tube.

Instead of a hinged connection between the doors and the body a connection of the type of a sliding door can also be used, wherein instead of the hinges 660, the corresponding sliding door fittings are employed.

The vehicle door 710 shown in FIG. 22 differs from the unit of FIG. 21 mainly in that the unit carrier 712 is integrated with the inner lining as well as with the interrupted reinforcing tubes 718 shown by the broken outline in FIG. 22. The unit carrier can be made of SMC since the two reinforcing tubes 718 provide the stiffness necessary for the doors 710. Tubes 718 can be premolded or can be later inserted in corresponding cylindrical passages. The crossed arm window winder 126 shown by the interrupted outline is assembled from the outside with the inner lining of the integrated unit carrier 712. The two door hinges 760 are connected corresponding to the hinges 616 in FIG. 21 via connecting links 762 with the reinforcing tubes 718. The flat portions 746 on the tube ends are in this case directly riveted, screwed or welded to the links 762.

Corresponding to FIG. 21 a top locking arrangement 768 of conventional design is secured on the end of the top reinforcing tube 718 (at top right in FIG. 22). The lower locking arrangement on the door side 770 is shown in more detail in FIG. 23. It consists of a pivotal plate 770a which projects vertically from the flat portion 746 in the plane of the door to the inside of the door and is pivotable by a relatively small angle on the flat portion 746 around a vertical pivot axis 770c in the direction of the arrow C in FIG. 23. The pivotal motion can be triggered by a connecting mechanism (not shown) from the door lock. From the pivotal plate 770a a locking bolt 770d projects perpendicularly in the direction away from the door 710. On the door frame 774 (shown as interrupted) on its inner peripheral surface there is a relatively flat recess 774a open toward the exterior of the vehicle, the lateral edges of which 774b serve as the introductory surfaces for the rounded pivotal plate 770a, and whose recessed base 774c is provided with a bore 774d for the locking bolt 770d. On closing the door 710, the pivotal plate 770 moves into the recess 774a. In the closed position of the door 710, the locking bolt 770d latches into the bore 774d. To open the door 710 on actuating the door lock, the pivotal plate 770a is pivoted away from recess 774a until the locking bolt 770d disengages from the bore 774d. The door can then be opened.

The securing of the outer shell 714 after assembly and adjustment of window winder 726 on the unit carrier 712 differs from the securing of the outer shell 614 on the door frame 616 according to FIG. 21. In the latter case the outer shell 614 is folded on its edges with the frame 616, whereas in the embodiment in FIG. 22, the outer shell 714 is clipped to the integrated unit carrier 712, as explained above on the basis of FIGS. 16–20. FIG. 22 shows a row of assembly clip parts 776 which on assembly of the outer shell 714 and the integrated unit carrier 712 engage in the U-shaped edge 778 of unit carrier 712.

Figure 24:
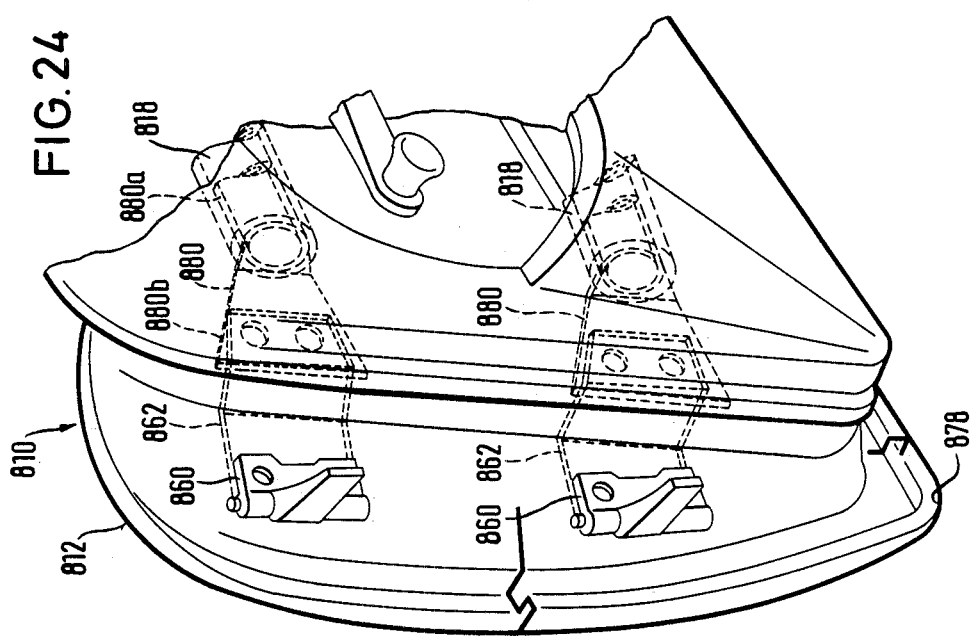
FIG. 24 is the hinge side of a carrier unit designed as the inner wall similar to that shown in FIG. 22.

Such a U-shaped edge in cross-section 878 can be better seen in the cut away drawings in FIGS. 24 and 25 of a further embodiment of a door unit 810. The hinge side shown in FIG. 24 of the vehicle door 810 differs from the hinge side of the door 710 in FIG. 22 only in that the connecting links 862 between the hinges 860 and the reinforcing tubes 818 are not directly disposed on the flat portions 746 in FIG. 22 but on base parts 880, which on the one hand consist of a cylinder section 880a inserted in the respectively open end of the reinforcing tube as well as a link section 880b extending from the section 880a. This angled link section 880b is rigidly connected with the respective connecting link 862, especially it is riveted or welded. This embodiment has the advantage that the reinforcing tube 818 can be inserted without impediment by possible flat portions into a corresponding cylindrical receptacle of the integrated unit carrier 812. Lastly the respective base part 880 must be inserted and connected with the connecting link 862.

The bottom reinforcing tube 818 is equipped like the reinforcing tube 718 of FIGS. 22 and 23 on its door lock end with a lower locking arrangement 870. This comprises a fork-type locking plate 870a as well as a locking fork 870b which is hinged on locking plate 870a (hinged bolts 870c) and is connected with a rod (not shown). The fork can be fastened or released by the rod in the locked position 870b' indicated by the dash-dotted outline when the door is closed 810. The locking plate 870a is provided with a perpendicularly projecting cylinder section 870d, which in its turn is inserted in the lower reinforcing tube 818. On the inner peripheral surface of the door frame 874 there is a corresponding recess 874a for the reception of the fork-type locking plate 870a which is open toward the inside of the door. From the recess base 874c, a locking bolt 874d projects vertically which when the door is closed is grasped by the fork-type locking plate 870a as well as by the locking fork 870b. As the door 810 further closes the locking fork 870b in FIG. 25 pivots clockwise until it finally adopts the above-mentioned locked position 870b' with the fork downwardly opened. It is clear that the door 810 cannot be opened as long as the locking fork 870b is kept in this locked position 870b' by the door lock. To open the door 810 again, the blocking of the locking fork 870b has only to be removed.

Figure 28:
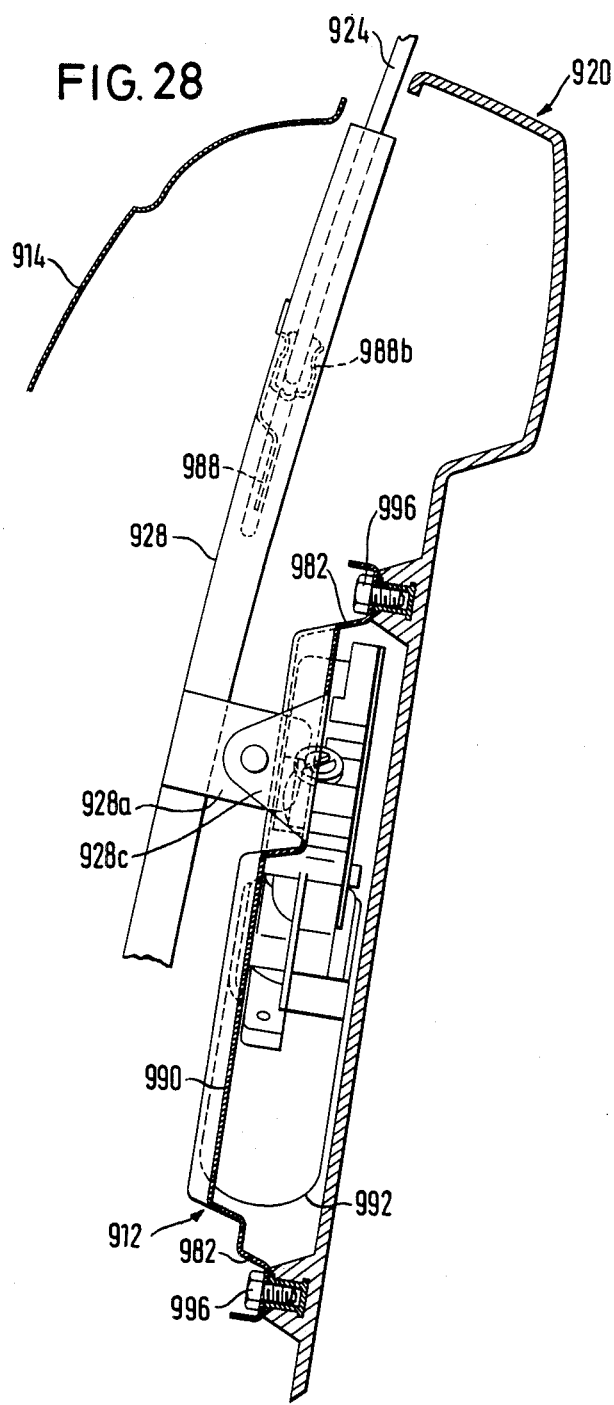
FIG. 28 is a section of the assembled door according to FIG. 27 along the line XXVIII—XXVIII.
Figure 29:
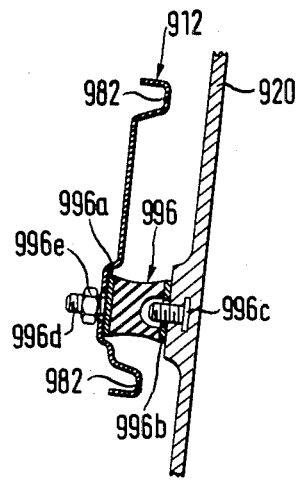
FIG. 29 is a corresponding section along the line XXIX—XXIX.
Figure 30:
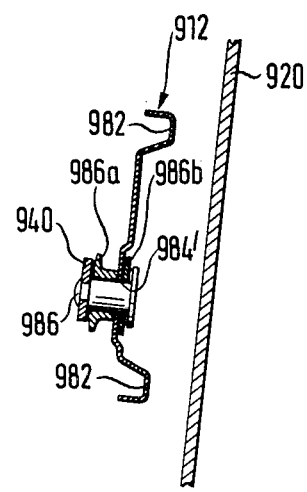
FIG. 30 is a corresponding section along the line XXX—XXX

The door units shown in FIGS. 26 to 31 has an especially low weight since the unit carrier 912 is formed only from a relatively narrow integral sheet stamped part which is itself stiffened by the corresponding profile stamping, so that separate stiffening elements are not needed. As the sections in FIGS. 28 to 31 show clearly, the unit carrier 912 is provided with a peripheral U-shaped rim strip 982. On its end on the lock side (top right in FIG. 26) the unit carrier is right-angled towards the outside of the door. In the angle 982 a door lock 966 is inserted and is secured by securing screws (not shown) on the unit carrier, with said screws passing through the securing holes 920a to both sides of the angled edge. A locking arrangement 968 on the door lock 966 on the door side in the form of a locking hook is located in the area of a passage 968a in the edge of the angle 982; the door-side locking arrangement 968 can therefore interact with a frame-side locking arrangement (not shown). The unit carrier 912 has in the area of the door lock 966 only a vertical height which corresponds to that of the door lock 966. The section of the unit carrier 912 continuing to the end of the unit carrier on the lock side is even narrower and moreover is provided with horizontal elongated slits 984 with a profiled elongated slit edge reducing the weight of the unit carrier 912, and on the other hand, increasing its stiffness. Four such elongated slits 984 can be seen in FIGS. 26 and 27; one of these elongated slits, the elongated slit 984', is kept narrower and serves as the guide slit for an arm 940 of a crossed arm window winder 926. The section in FIG. 30 shows a bolt 986 riveted to the end of the arm 940 which passes through the elongated slit 984'; the unit carrier 912 is clamped between a slide piece 986a in the area of elongated slit 984' and a pressure disk 986b, both of which parts are supported by the bolt 986. The slide piece 986a is elastically sprung in the axial direction, so that oscillations between the arm 940 and the unit carrier 912 are absorbed by the spring. The elongated slit 984' thus forms a window winder slide rail integral with the unit carrier 912.

Figure 26:
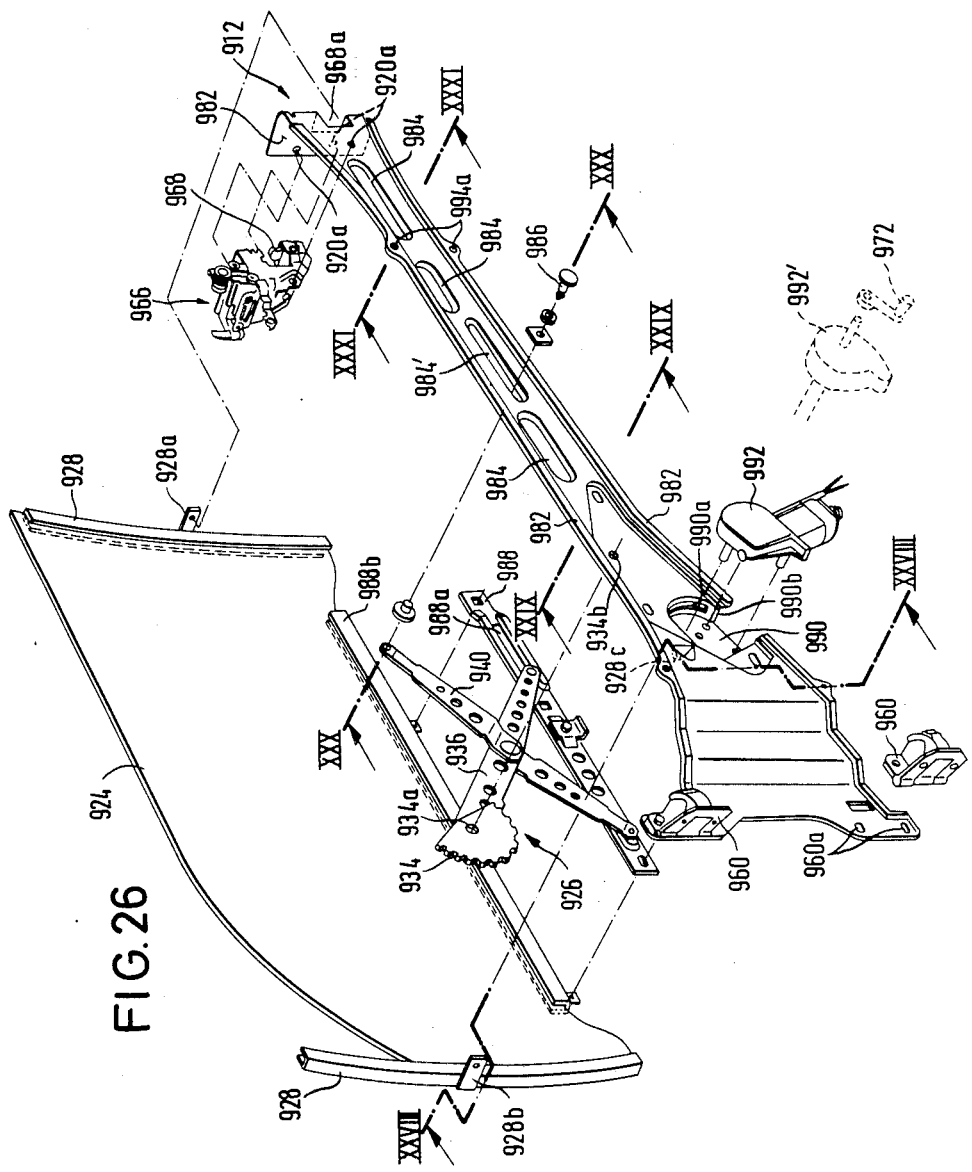
FIG. 26 is a cut away drawing of a further embodiment of an inventive unit carrier with a crossed arm window winder, a window pane and a door lock.

The other arm 936 fitted with a cog sector 934 of the crossed arm window winder 926 is also mounted on the unit carrier 912 via a rotary bearing bolt not shown in FIG. 26, which passes through both a bearing aperture 934a in the sector center as well as a bearing aperture 934b in the unit carrier 912. The two other ends of the arms 936 and 940 are connected in the usual way with a winder rail 988 while the arm 940 is hinged on the winder rail 988 and the arm 936 is longitudinally movable in an elongated groove 988a. On said winder rail 988 a U-shaped profile 988b has to be secured on the lower horizontal rim of pane 924 during assembly. Two lateral guide rails 928 of the pane 924 have in their centre respectively a connecting link 928a for securing on the unit carrier 912. The securing link 928a on the door lock side is screwed firmly to the bent end of the unit carrier 912, or is riveted or is spot welded thereto. The securing link 928b on the door latch side is secured on an approximately triangular latched lobe 928c, which according to FIG. 28 is latched in the area of a stamped receptacle 990 for an electro-motor window winder 992. As FIG. 26 shows the receptacle 990 is open toward the inside of the unit carrier 912; the electromotor is thus inserted from the inside in the receptacle 990. In FIG. 26 we see that there is a slit 990a in a sidewall of the receptacle 990 perpendicular to the door plane. This slit 990a is opposite a drive pinion of the electromotor 992 which is not shown in the drawings.

In the assembly of the window winder 926 on the unit carrier 912 (rotary bearing of the arm 936 in the bearing aperture 934b as well as the longitudinally displaceacble positioning of the arm 940 in the elongated slit 984') the cog sector 934 engages via the slit 990a in the drive pinion. The winder cross has to be assembled from the outside of the unit carrier 912 facing the outer shell 914.

Toward the two door hinges 960, the unit carrier 912 widens gradually until in the area of hinge 960 it has a height corresponding to the hinge spacing. In the direction of hinge 960 the unit carrier 912 is stepped so that the end forming the actual hinge base of the unit carrier 912, when assembled with the outer shell 914, abuts said outer shell. As shown in FIG. 26, the broadened unit carrier end has respectively two securing holes 960a for the direct fastening of the hinge 960. These holes can be horizontal elongated slits to make possible an adjustment of hinge 960.

Figure 27:
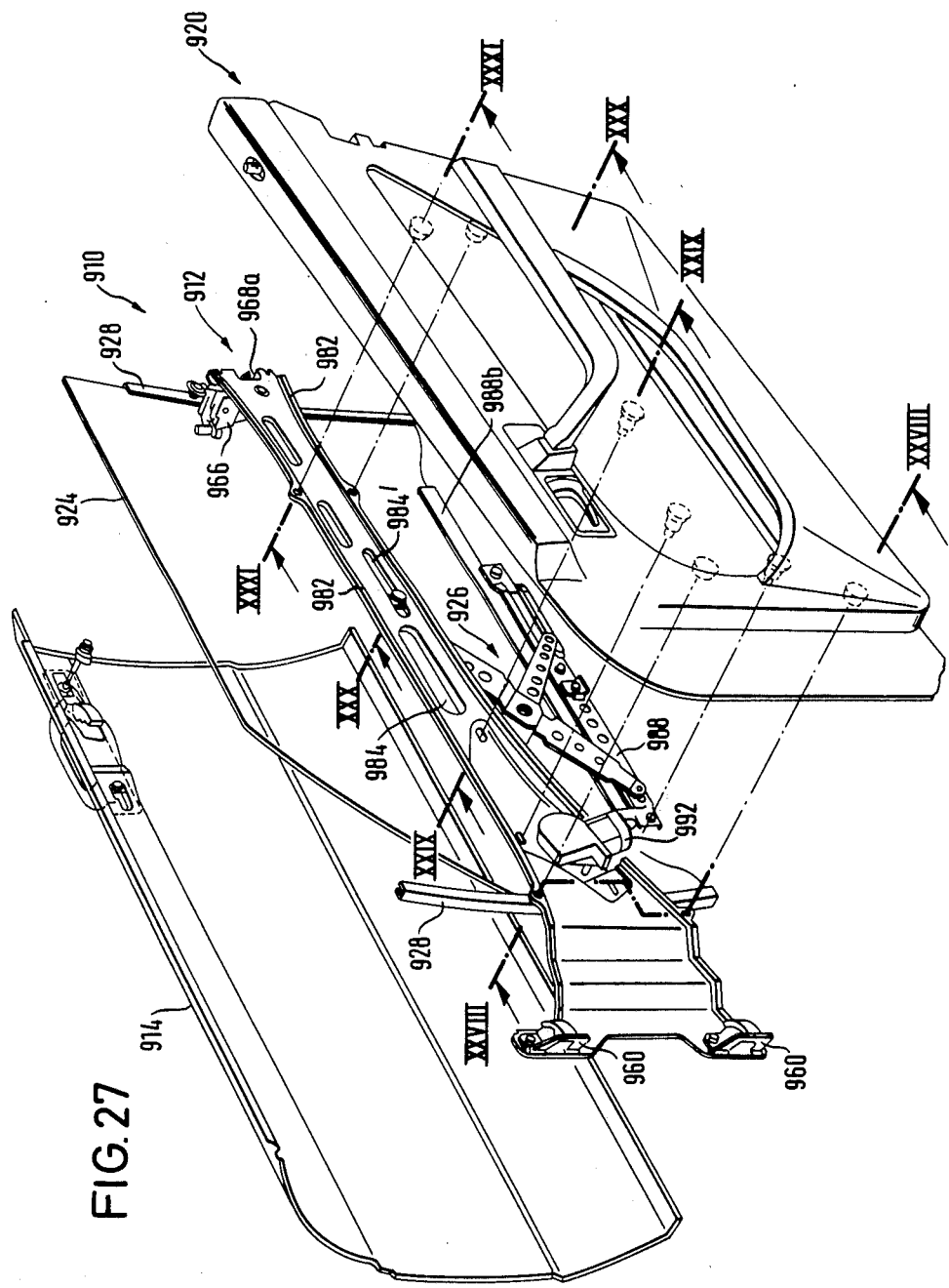
FIG. 27 is a cut away drawing of a vehicle door unit with the unit carrier according to FIG. 26.
Figure 31:
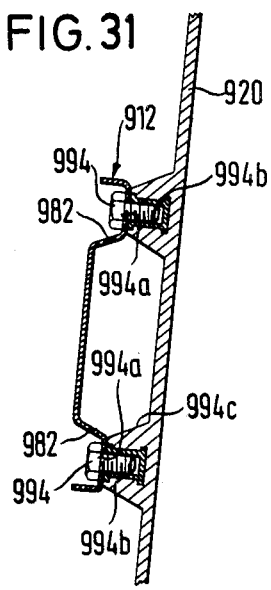
FIG. 31 is a corresponding section along the line XXXI—XXXI.

After assembly and adjustment of the window winder 926 on the unit carrier 912 according to the cut-away drawing in FIG. 26, the inner lining 920 is screwed to the unit carrier 912, as shown in FIGS. 27, 29 and 31.

Two securing screws 994 seen in FIG. 31 which are vertically superimposed pass through the securing holes 994a between the elongated slit 984' and the angled narrow unit carrier end in the floor of the upper or the lower U-shaped rim strip 982; in this area the U-shaped rim strips 982 are slightly widened. The screws 994 engage in screw-in sleeves 994b, which are molded in frustum shaped thickenings 994c on the outside of the inner wall or of the inner lining 920 and are made of SMC.

In the area of the rotary bearing for the cog sector 934 there is a further fastening of the unit carrier 912 on the inner lining 920. A shock-absorbing rubber cylinder 996 is, according to FIG. 29, inserted between the unit carrier 912 and said inner lining 920, and on both front sides respectively it is provided with a vulcanized securing plate 996a and 996b. The right hand plate 996b shown in FIG. 29 is connected with the inner lining 920 in that a screw bolt 996c cast integrally in the inner lining 920 engages in the inner thread of the plate 996b. The other plate 996a is provided with a screwbolt 996c which passes through a corresponding aperture of the unit carrier 912 and on which a nut 996e is screwed to fasten the unit carrier 912. Thus there is vibration decoupling between the arm 936 of the window winder 926 and the unit carrier 912. Vibrations which arise are damped down between the two parts.

The unit carrier 912 is further secured by two screwbolts 996 seen in FIG. 28 above and below the receptacle 992 on the inner lining 920. Corresponding to the screws 994 in FIG. 31, the screws 996 are in turn inserted in holes on the base of the two U-shaped rim strips 982 and are screwed into integrally cast screw-in sleeves of the inner lining 920.

The thus mounted assembly comprising the unit carrier 912 supporting the window winder 926, the pane 924 as well as the inner lining 920 screwed thereto is then provided with the outer shell 914, which can either be done like the preceding steps on an ancillary assembly line or can be done on the main assembly line for the car body.

In an alternative embodiment(not shown) after the mounting of the window winder and its motor on the unit carrier, the latter can first be fitted with the correspondingly designed outer shell and then supplied with the inner lining either on the ancillary assembly line or on the main assembly line.

In the inventive embodiment of FIGS. 26–31, it is possible to install a manual crank drive 992' which is shown in FIG. 26 by the interrupted outline instead of the window winder electromotor drive (electric motor 992).

The drive 992' is also inserted in the receptacle 990. The crankhandle which is to be fitted at the end from the outside of the inner lining 920 is shown in FIG. 26 as 972. The decision as to which type of drive should be used for the window winder 926 has to be taken only before the connection of the unit carrier 912 and the inner lining 920 at the latest.

While a specific embodiment of the invention has been shown and described in detail to illustrate the application of the inventive principle, it will be understood that the invention may be embodied otherwise without departing from such principle.

What is claimed is:

1. A vehicle door comprising
   an outer shell,
   an inner panel,
   a unit carrier means mounted between the outer shell and inner panel and for reinforcing the door and for mounting a window winder means before the assembling of the door,
   a door reinforcing element between the outer shell and the inner panel for mounting door hinge parts and locks,
   one of window winding mechanism and linkage parts movably mounted to the unit carrier,
   wherein the unit carrier is equipped with at least one reinforcing tube, one end of said tube being developed as a base for a hinge and the other tube end of said tube being developed as a base for a lock.

2. A vehicle door according to claim 1, wherein
   one of a hinge base part and a lock base part is connected with a corresponding tube and is partially inserted into said tube end.

3. A vehicle door according to claim 2, wherein at least one of the inserted base parts, via supporting tabs is fastened at a box section of said door reinforcing element.

4. A vehicle door according to claim 1, further comprising a plug penetrating one of a base parts said door reinforcing element frame and the outer skin.

5. A vehicle door according to claim 1,
   wherein the base part of a lock is a box type and carries at least parts of one of a locking mechanism and a locking cone.

6. A vehicle door according to claim 1, wherein the unit carrier means is developed with a molded-on brake housing for a loop spring brake of the window winder.

7. A vehicle door according to claim 1, wherein the unit carrier means further comprises
   a molded-on guide for a driving segment of the window winder mechanism.

8. A vehicle door according to claim 1, further comprising
   a molded-on receiving means for a window winder mechanism motor, the receiving means being mounted on the unit carrier.

9. A vehicle door according to claim 1, wherein the unit carrier means further comprises
   pivot bearings for parts of said window winder mechanism
   a toothed segment mounted on one of said pivot bearings,
   a lever arm for a driving pinion mating with the toothed segment, preferably in the form of a baseplate carrying corresponding bearing bolts and pressed onto a bearing plate.

10. A vehicle door according to claim 9, further comprising
    a counter-bearing plate substantially parallel to the bearing plate and at a distance therefrom,
    bearing bolts disposed on the bearing plate and
    wherein said driving pinion is mounted for rotation at least on the counter-bearing plate of a window winder mechanism motor.

11. A vehicle door according to claim 1, wherein the unit carrier means is developed with a guide groove for one of a pulley and a sliding block of a window winder arm.

12. A vehicle door according to claim 1, wherein the unit carrier means is developed with at least one molded-on lateral window guide.

13. A vehicle door according to claim 1, wherein the unit carrier means is developed with at least one adjustable lateral window guiding means, preferably in the form of a guiding rail which at one of its ends is linked to a bolt mounted on a bearing unit carrier plated the unit carrier and which at its other end, can be adjusted by means of a threaded rod disposed at the unit carrier means and extending transversely to the guiding rail.

14. A vehicle door according to claim 1, wherein at the unit carrier means at least one sealing lip is provided that is arranged in parallel next to one another and rests against the window.

15. A vehicle door as set forth in claim 1, said door reinforcing element further comprising
    horizontally elongated reinforcing means with plural ends and having at one of its ends an upper and a lower securing base for an upper and a lower door hinge and
    at the other end having an upper and a lower locking means interacting with corresponding counter locking means and operable by a door lock.

16. A vehicle door as set forth in claim 1, wherein the unit carrier means has two reinforcing tubes, an end of each of said tubes respectively is designed as a base for at least one door hinge and a second end of each tube is respectively the base for one of first and second locking means.

17. A vehicle door as set forth in claim 1 wherein the unit carrier means comprises
    an elongated and stiffened bearing plate, which at one end is designed as a securing base for a locking means and at a second broadened end is a securing base for at least two mutually spaced door hinges.

18. A vehicle door as set forth in claim 17, wherein the unit carrier means is provided with a receptacle on one side open to receive a window winder drive motor with an aperture accessible from a second side for passage of a drive element and with a window winder mechanism disposed on the second side of said unit carrier.

19. A vehicle door as set forth in claim 18, wherein the unit carrier means comprises an elongated slit and the window winding mechanism comprises
    a support arm hinged on the unit carrier means,
    a cog sector mounted on said support arm, and
    a second arm displaceably mounted in said slit.

20. A vehicle door comprising an outer shell,
an inner panel,
a unit carrier means disposed between the outer shell and inner panel and for reinforcing the door and for mounting a window winder means before the assembling of the door,
a door reinforcing element between the outer skin and the inner panel for mounting door hinge parts and locks,
one of window winder means and linkage parts movably mounted to the unit carrier,
wherein the unit carrier means is equipped with at least one reinforcing tube, one end of said tube being developed as a base for a hinge and the other tube end of said tube being developed as a base for a lock,
one of a hinge base part and a lock base part is connected with a corresponding tube and is partially inserted into said tube end, and
at least one of the inserted base parts, via supporting tabs is fastened at a box section of a door frame.

21. A vehicle door comprising
(a) an outer panel,
(b) an inner panel,
(c) a door frame,
(d) a door reinforcing element provided with window-winder mounting means,
(e) means for attaching said reinforcing element to said door frame,
(f) means for attaching said outer and said inner panel to said frame with said door reinforcing element between said outer and inner panels,
said door reinforcing element comprising two horizontally extending reinforcing tubes, one end of said tubes each being provided with a door hinge mounting means and the other end of at least the upper tube being provided with a door lock mounting means.

22. A vehicle door comprising
(a) an outer panel,
(b) an inner panel provided with window-winder mounting means,
(c) a door frame,
(d) means for attaching said outer and said inner panel to said door frame,
wherein said inner panel is provided with two horizontally extending reinforcing tubes, one end of said tubes each being provided with a door hinge mounting means and the other end of at least the upper tube being provided with a door lock mounting means.

23. A vehicle door comprising
(a) an outer panel,
(b) an inner panel provided with window-winder mounting means,
(c) means for attaching said outer panel to said inner panel,
wherein said inner panel is provided with two horizontally extending reinforcing tubes, one end of said tubes each being provided with a door hinge mounting means and the other end of at least the upper tube being provided with a door lock mounting means.

24. A vehicle door according to claim 22, wherein a door base part is partially inserted into said one end of each of said tubes and wherein a door lock base part is partially inserted into said other end of at least said upper tube.

25. A vehicle door according to claim 23, wherein a door base part is partially inserted into said one end of each of said tubes and wherein a door lock base part is partially inserted into said other end of at least said upper tube.

26. A vehicle door according to claim 24, wherein at least one of the inserted base parts is fastened to a box section of said door frame.

27. A vehicle door according to claim 25, wherein at least one of the inserted base parts is fastened to a box section of said door frame.

28. A vehicle door comprising
(a) an outer panel,
(b) an inner panel,
(c) a door reinforcing element,
(d) means for attaching said door reinforcing element to said inner panel,
(e) means for attaching said outer panel to said inner panel with said door reinforcing element between said outer and inner panels,
wherein said door reinforcing element consists of a horizontally elongated plate which at one longitudinal end is provided with door lock mounting means and at the other longitudinal broadened end is provided with mutually spaced door hinge mounting means which plate is further provided with a stamped receptacle to receive a window-winder drive motor for driving a support arm hinged on said door reinforcing element and with an elongated slit for displaceably guiding an end of an auxiliary arm hinged on said support arm, and wherein said plate is provided on its two longitudinal edges each with a U-profile rim strip.

29. A vehicle door in accordance with claim 22, further comprising
at least one lateral guide rail rotatably mounted at a first end thereof to said unit carrier,
the at least one lateral guide rail extending, pivotably in a window pane plane substantially orthogonal with respect to at least one of said reinforcing tubes,
means mounted to said unit carrier proximate a second end of said at least one lateral guide rail for adjusting the position of said second end of said lateral guide rail with respect to the unit carrier.

* * * * *